(12) United States Patent
Oberbeck et al.

(10) Patent No.: US 6,436,720 B1
(45) Date of Patent: Aug. 20, 2002

(54) RESIDENCE TIME PROVIDING MODULE/APPARATUS

(75) Inventors: Sebastian Oberbeck, Greifenstein; Andreas Oberbeck, Weisbaden; Klaus Golbig, Maintal-Doernigheim; Michael Hohmann, Darmstadt, all of (DE)

(73) Assignee: Cellular Process Chemistry, Inc., Kennewick, WA (US)

( * ) Notice: Subject to any disclaimer, the term of this patent is extended or adjusted under 35 U.S.C. 154(b) by 0 days.

(21) Appl. No.: 09/662,678

(22) Filed: Sep. 15, 2000

(51) Int. Cl.[7] ................................................. G01N 1/10
(52) U.S. Cl. ........................... 436/180; 137/1; 137/571; 137/572; 210/97; 210/205; 210/49; 422/62; 422/81; 422/129; 422/131; 422/110
(58) Field of Search ............................ 137/1, 2, 15.05, 137/88, 93, 571, 625.28, 625.31, 551, 572; 210/85, 97, 143, 198.1, 205, 739, 749, 774, 175; 422/50, 62, 81, 82, 105, 110, 119, 129, 130, 131, 138, 191, 224, 240; 436/164, 174, 809, 180

(56) References Cited

U.S. PATENT DOCUMENTS

| | | | |
|---|---|---|---|
| 4,702,073 A | | 10/1987 | Melconian ................ 60/39.464 |
| 5,468,643 A | | 11/1995 | Su et al. ...................... 436/161 |
| 5,482,862 A | * | 1/1996 | Lapack et al. |
| 5,516,423 A | | 5/1996 | Conoby et al. ............... 210/85 |
| 5,580,523 A | * | 12/1996 | Bard |
| 5,690,763 A | * | 11/1997 | Ashmead et al. |
| 6,036,355 A | | 3/2000 | Yant et al. ................ 366/171.1 |
| 6,063,019 A | | 5/2000 | Wade ........................... 494/14 |

FOREIGN PATENT DOCUMENTS

| | | |
|---|---|---|
| EP | 0 721 033 A | 7/1996 |
| FR | 2 770 556 A | 5/1999 |
| WO | WO 99/04892 | 2/1999 |
| WO | WO 00 46470 A | 8/2000 |

\* cited by examiner

*Primary Examiner*—Joseph W. Drodge
(74) *Attorney, Agent, or Firm*—Ronald M. Anderson

(57) ABSTRACT

A variable residence time chamber module that provides an additional residence time for a reaction of mixed reactants to reach completion. The module includes a thermally insulated housing in which are disposed a plurality of residence time chambers. A rotary inlet valve and rotary outlet valve select among the plurality of chambers, coupling them respectively to an inlet port through which the mixed but incompletely reacted reactants are supplied and an outlet port through which a desired product of the reaction is withdrawn. A heat transfer media is preferably used to control the temperature of the residence time chambers, so that an optimal reaction temperature is provided. The mixed reactants pass through the inlet valve into a selected one of the plurality of residence time chambers. Once the selected residence time chamber is full, the inlet valve is actuated to supply the mixed reactants to a successive residence time chamber. After the reactants in a filled residence time chamber have completely reacted to form the desired product, the outlet valve is actuated to withdraw the desired product. Because a plurality of different residence time chambers are provided, it is possible for the module to be used with a chemical processing system that produces different products in sequence. Each of the residence time chambers can be filled with a different mixture of reactants. It is then preferable that the valves and empty residence time chambers be flushed with solvent to ensure that no cross-reactions and no contamination occurs among different reactants/products.

66 Claims, 9 Drawing Sheets

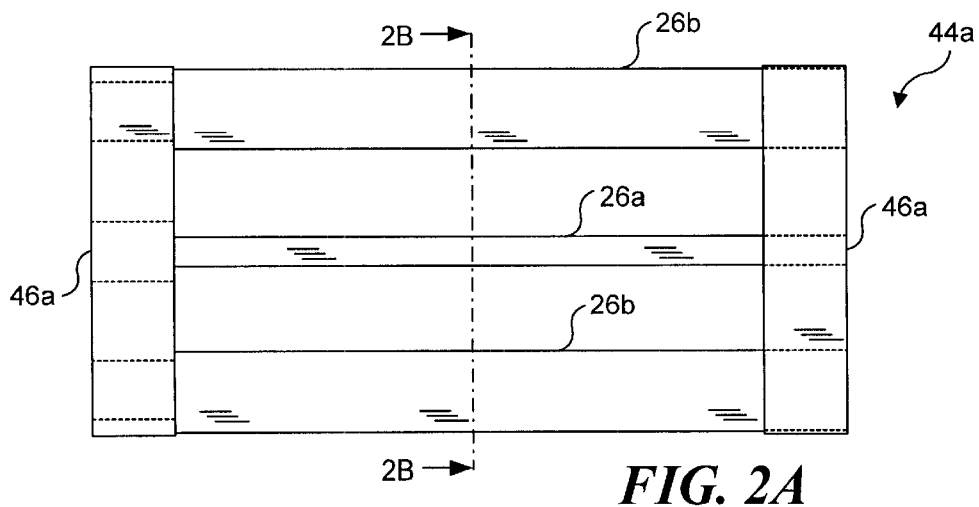
FIG. 2A
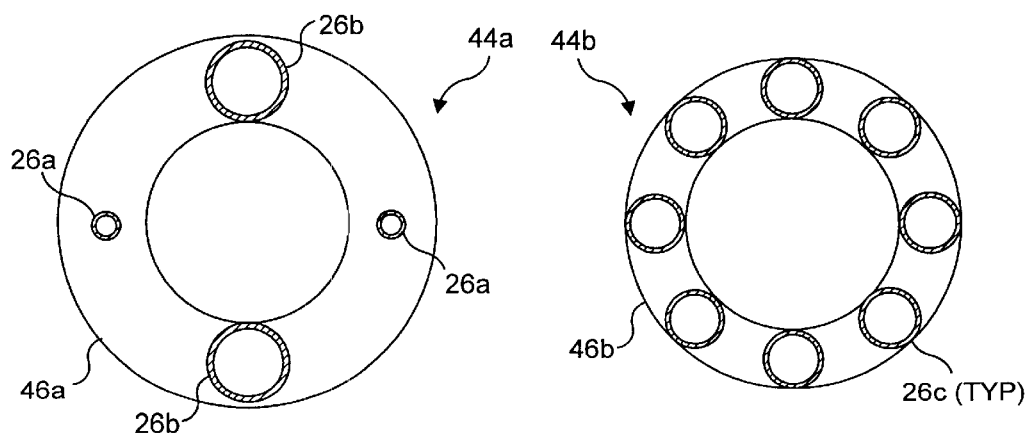
FIG. 2B  FIG. 3B
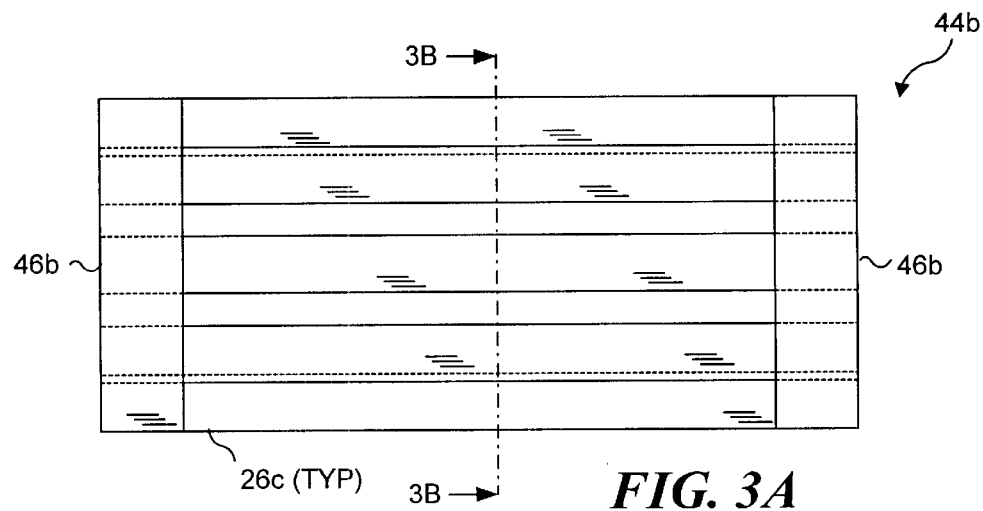
FIG. 3A

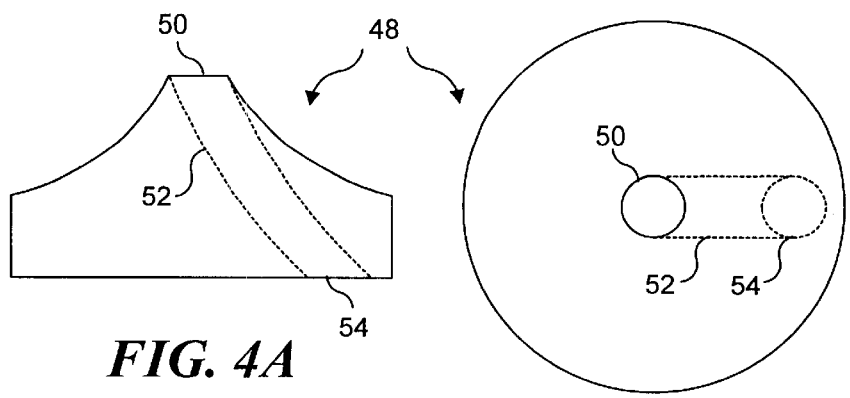
FIG. 4A  FIG. 4B
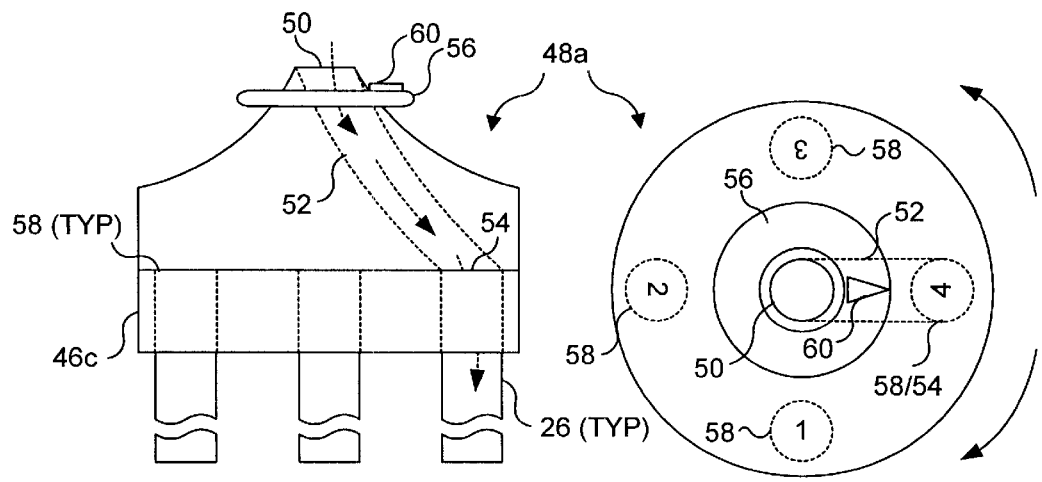
FIG. 5A  FIG. 5B
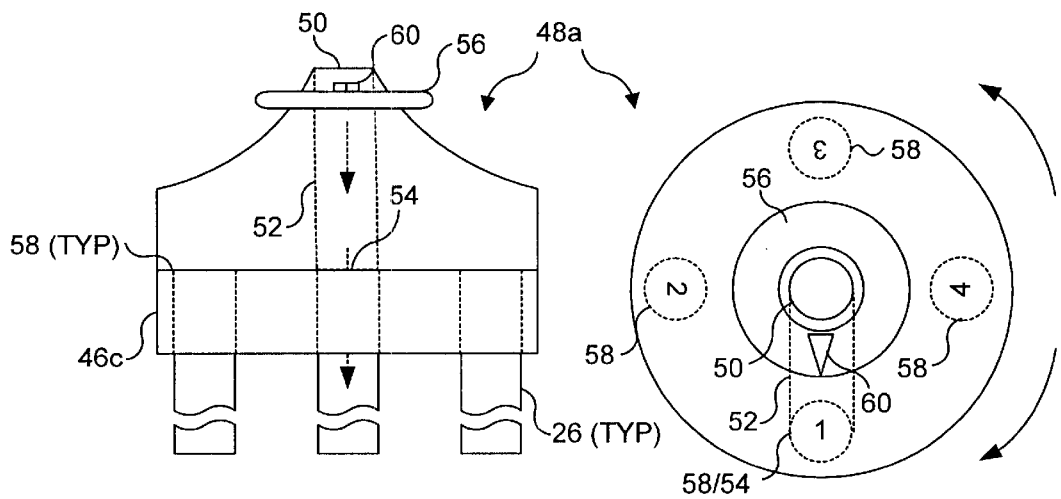
FIG. 6A  FIG. 6B

RESIDENCE TIME PROVIDING MODULE/ APPARATUS

FIELD OF THE INVENTION

This invention generally relates to chemical processing apparatus, and more specifically, to a module for providing sufficient residence time to ensure that mixtures of reactants supplied to a chemical reactor have sufficient time to completely react with one another before the resulting product is output from the apparatus.

BACKGROUND OF THE INVENTION

Methods of controlling and optimizing the production of chemical substances are well known. The control of parameters such as temperature, pressure, mixing conditions, relative volumes of the reactants, and the use of catalysts are generally well understood. Processing equipment for facilitating chemical reactions can be specifically designed for one particular reaction, or can be designed to facilitate the processing of more than just one specific chemical reaction.

Ideally, equipment designed for processing more than a single specific chemical reaction should be adjustable so that it can be used to facilitate a variety of different chemical reactions of interest. For example, because different chemical reactions require different temperature conditions, chemical processing equipment should enable temperature conditions in the equipment to be varied, so that the optimal temperature for a particular reaction can be provided.

While it is relatively easy to design processing equipment that enables temperature conditions to be adjusted, it is more challenging to design processing equipment that enables all relevant parameters to be adjusted. Reaction time (i.e., processing time) is another parameter that should be precisely controllable. Each different reaction is characterized by having an optimal processing time required to ensure that the reactants have sufficient time to completely react with one another. Ensuring that sufficient processing time is provided in a chemical processing system is critical to achieving good product yields and process efficiency. Providing too little time reduces product yield, because the product will include reactants that have not yet reacted to form the desired product. The processing time required in a given chemical processing system is a function of the specific reaction, the temperature of the reactants, and concentration and volume of the reactants. The amount of processing time provided by a given chemical processing system is a function of the volume of the reactor or reaction chamber within the system, and the flow rate of the reactants into the reactor (or reaction chamber). While the volume of the reaction chamber within a particular chemical processing system is generally fixed, flow rates can typically be varied throughout at least a limited range. Accordingly, the volume of the reaction chamber and the flow rates of the reactants should be selected to ensure that the reactants have sufficient time to thoroughly react.

However, there are instances in which additional processing time may be required for a particular reaction. In this case, it is well known in the art to provide "residence time chambers" or modules down stream of a reaction chamber. Basically, a residence time chamber is a volume into which the already mixed reactants (exiting a reaction chamber or reactor) are diverted. The mixed reactants are held in the residence time chamber for a length of time sufficient to ensure that the desired reaction has been completed before the resulting product and any byproducts are directed into a collection vessel. Thus, residence time chambers can be beneficially incorporated into a chemical processing system when the volume of the reaction chamber and the available reactant flow rates within that chemical processing system cannot otherwise be readily modified to provide sufficient processing time.

Some residence time chambers are integral and unique to specific chemical processing systems and are not designed or intended to be replaceable or usable in other systems. U.S. Pat. No. 5,516,423 (Conoby) describes a chemical processing system in which a residence time is varied by controlling the effective volume of a reaction chamber supplied with a liquid effluent and a treatment chemical. A valve controls an outlet port from the reaction chamber, and a sensor determines whether a desired result has been achieved. Once the desired result has been achieved, the outlet valve is opened and the treated effluent is discharged. Accordingly, the outlet valve is controlled to vary the residence time of the reactants within the reaction chamber. However, new effluent continues to enter the reaction chamber during the residence time, so that the volume of effluent within the reaction chamber is not constant. To maximize product yield and quality, it is preferable to more precisely control the influx of reactants into a reaction chamber and the time of the reaction, rather than simply retaining the reactants in a reaction chamber until a desired result is achieved.

Many chemical processing systems are designed to operate with a constant volume of reactants in the reaction chambers, to ensure that unwanted byproducts caused by varying the relative concentrations of the reactants are not formed. For this reason, the method used to vary the residence time, as described in the above-noted patent, is generally not applicable to many types of reactions, or not desirable. It is preferable to include a separate residence time chamber down stream of the reaction chamber. Residence time chambers of many different types are known. Some residence time chambers are simply unobstructed chambers or fluid paths into which mixed reactants are directed, and the physical dimensions of the chamber or fluid path are such that the time necessary for the mixed reactants to traverse the chamber or fluid path provides the required residence time. Other residence time chambers include baffles or other types of flow restriction elements designed to increase the length of time required for the mixed reactants to traverse the chamber. Such residence time chambers are frequently integral components of chemical processing systems and are not designed to be selectively configurable to provide variable residence times. Furthermore, known residence time chambers typically incorporate a single fluid path, with a volume that controls the additional residence time provided by the residence time chamber.

A simple tube open at both ends can be used as a residence time chamber, and the additional reaction time provided by the device is strictly determined only by the flow rate of the reactants and the volume of the tube. A disadvantage of a simple tube type residence time chamber is that the additional reaction time can be only varied only by changing the flow rate (i.e., by changing the production rate of the chemical processing system, which will generally already have been optimized for a particular chemical production system), or by selecting and installing an appropriately sized tube from a stock of such tubes having different volumes.

It would therefore be desirable and preferable to provide a residence time chamber that is selectively configurable to provide variable residence times without changing to a different residence time chamber. Preferably, such a residence time chamber should incorporate a plurality of fluid paths, and the fluid paths should be individually controllable to provide the same or different residence times. It would further be desirable for such variable residence time chambers to be modular in nature, so that different residence time modules having different ranges of available residence times or other desired properties can be used in a chemical processing system or with a chemical reactor.

Recently, much attention has been directed to the use of microreactors for both research and development work, and the production of chemical products. Microreactors offer several clear advantages over more conventional macroscale chemical processing systems. Accordingly, it would be desirable to provide a variable residence time chamber adapted to be used with microreactors. The prior art does not teach or suggest such a modular, variable residence time chamber.

SUMMARY OF THE INVENTION

In accord with the present invention, a variable residence time module is defined. Unlike the prior art, the present invention employs a single residence time module that can provide different duration residence times in response to control signals supplied by a control unit.

A variable residence time chamber in accord with the present invention includes a housing having an inlet port and an outlet port, an inlet valve, an outlet valve, and a plurality of residence time chambers disposed within the housing. The inlet valve and the outlet valve, respectively selectively couple the inlet port to one of the plurality of residence time chambers, and the outlet to one of the plurality of residence time chambers. A sufficient residence time for a reaction is provided by retaining the mixed reactants within the selected one of the plurality of residence time chambers for a time sufficient for the mixed reactants to completely react to form the desired product (or mixture of products). In the present invention, the reactants are generally not in motion except when the selected residence time chamber is being filled or emptied.

Preferably, in at least one embodiment, the housing includes a heat transfer media inlet, and a heat transfer media outlet. An inner volume of the housing is adapted to be substantially filled with a heat transfer media through the heat transfer media inlet, and spent heat transfer media exits through the heat transfer media outlet. Also, in at least one embodiment, the housing is fabricated from a material that provides a thermally insulating barrier between the ambient environment and the interior volume of the housing.

The configuration of the residence time chambers is not critical, and any of them can comprise either a substantially elongate tube, a coiled tube, or an irregular-shaped tube. Preferably, the plurality of residence time chambers are fabricated from a substantially chemically inert material. Examples of a suitable chemical inert material include metals, stainless steel, glass, plastics, and polymer coated materials.

One embodiment includes an additional inlet valve and an additional outlet valve, each selectively coupled with a selected different one of the plurality of residence time chambers. The inlet valves and outlet valves are preferably rotary valves that couple a selected residence time chamber to the inlet port, in the case of the inlet valves, and couple a selected residence time chamber to the outlet port, in the case of the outlet valves. It is anticipated that it will be useful to include markings on the inlet and outlet valves to enable an operator to determine which of the plurality of residence time chambers the inlet valve and the outlet valve are currently servicing.

In at least one embodiment, a residence time chamber support structure is included for supporting and mounting the plurality of residence time chambers within the housing. This residence time chamber support structure, and the associated plurality of residence time chambers are readily replaceable, so that a first residence time chamber support structure and a first plurality of residence time chambers can be replaced with a second residence time chamber support structure and a second plurality of residence time chambers, which may have different internal volumes.

Preferably, a prime mover is drivingly coupled to the inlet valve and the outlet valve, to selectively position the inlet valve and outlet valve automatically in response to a control signal. A power bus and a data bus are preferably included, the data bus being coupled to the prime mover to enable the residence time module to be automatically controlled by a separate control module, and the power bus electrically coupling the residence time module to a power source that provides an electrical current to energize the residence time module.

In yet another embodiment, at least one of the plurality of residence time chambers possess a diameter that is sufficiently small so as to enable a laminar flow within the residence time chamber. In still another embodiment, at least one of the plurality of residence time chambers include means that facilitate production of the desired chemical product. The means includes at least one of a glass bead packing, a silica packing, and a catalyst packing. Also included is a sensor that produces a signal indicative of a parameter relating to a reaction of the reactants within a residence time chamber, the sensor being either a temperature sensor, an electrochemical sensor, an optical sensor, or a pressure sensor.

Finally, in another embodiment, the variable residence time module includes at least one of a source of electromagnetic radiation, a source of sonic radiation, a source of alpha radiation, a source of beta radiation, a source of gamma radiation, a source of X-rays, a source of radioactive particles, a source of charged particles, a source of light, an electric field source, and a magnetic field source.

Another aspect of the present invention is directed to a method for selectively varying a residence time. The steps of this method are generally consistent with the functions of the elements of the residence time apparatus discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 2A is a side elevational view of a residence time chamber assembly that includes four separate residence time chambers, in accord with a first preferred embodiment of the present invention;

FIG. 2B is a cross-sectional view of the residence time chamber assembly of FIG. 2A, taken along section lines 2B—2B;

FIG. 3A is a side elevational view of a second residence time chamber assembly that includes eight residence time chambers, in accord with a second preferred embodiment of the present invention;

FIG. 3B is a cross-sectional view of the residence time chamber assembly of FIG. 3A, taken along section lines 3B—3B;

FIG. 4A is a side elevational view of a rotary valve for use in the present invention;

FIG. 4B is a top plan view of the rotary valve of FIG. 4A;

FIG. 5A is a side elevational view of an alternative rotary valve, shown in conjunction with a portion of a residence time chamber assembly, illustrating how the rotary valve is used to select one of the plurality of residence time chambers in the attached residence time chamber module;

FIG. 5B is a top plan view of the rotary valve and residence time chamber assembly of FIG. 5A;

FIG. 6A is a side elevational view of the rotary valve and residence time chamber module of FIGS. 5A and 5B, showing the rotary valve in fluid communication with a different one of the plurality of residence time chambers;

FIG. 6B is a top plan view of the rotary valve and residence time chamber assembly of FIG. 6A;

DESCRIPTION OF THE PREFERRED EMBODIMENT

Figure 1:
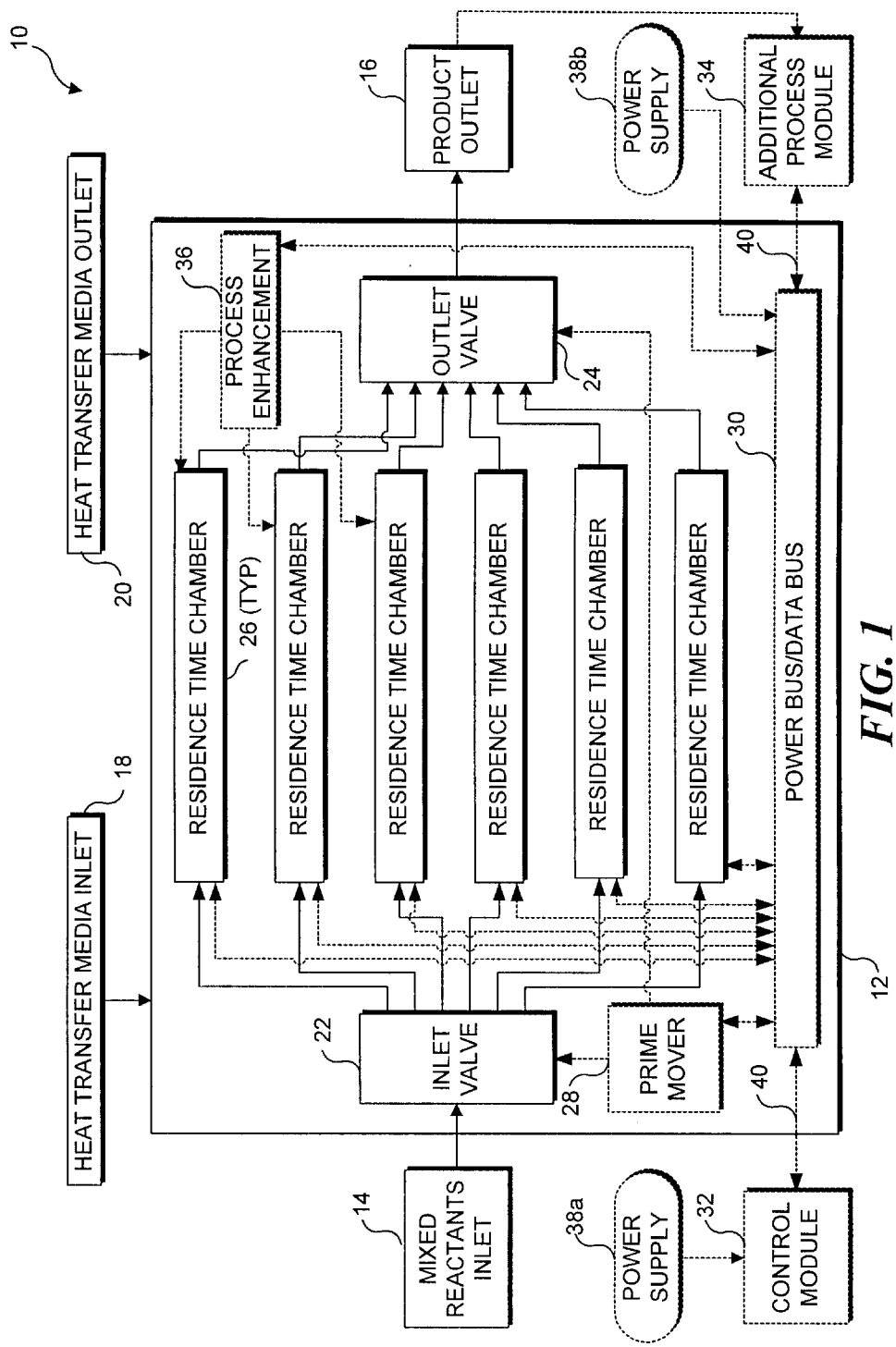
FIG. 1 is a block diagram of the functional elements of the present invention.

FIG. 1 schematically illustrates functional elements of the present invention, including a residence time chamber module 10 that is designed to be used in conjunction with an existing chemical processing system. Residence time chamber module 10 is employed when already-mixed reactants (and likely some already generated product) exiting a reaction chamber in an existing chemical processing system requires additional holding time, so that the reaction already initiated within a reaction chamber can proceed completely to its conclusion. It should be noted that in a preferred embodiment, residence time chamber module 10 will be coupled to the outlet of a reaction chamber or reactor of a "continuous process" chemical processing system.

A continuous process system is one in which reactants are continually fed into the chemical processing system at a relatively constant rate, over a relatively long period of time. This approach is in contrast to "batch process" systems, in which selected volumes of reagents are injected into a chemical reactor simultaneously, or over a relatively short period of time. Continuous process systems often operate without interruption, except when taken offline at regularly scheduled intervals for maintenance and repair. in contrast, batch process systems are generally not operated continuously.

One aspect of a continuous process is that a steady, regular flow of mixed reactants (and likely some product) exits the reactor portion of the system continually. If this flow is directed into a vessel of finite size, to prevent disruption of the continuous process, additional vessels must be available, so that the flow can be redirected into an empty vessel when the current vessel reaches capacity and is filled. As will be described in detail below, residence time chamber module 10 includes a plurality of individual chambers that function as the plurality of vessels discussed above. A finite volume of mixed reactants (and product) exits the reaction chamber of the continuous chemical processing system, and is directed into a first chamber in residence time chamber module 10. When the first chamber reaches capacity, the flow is directed into a next chamber in residence time chamber module 10. The finite volume in the first chamber is temporarily "stored" in the chamber, until a sufficient amount of time has passed such that all of the mixed but incompletely reacted reactants exiting the reaction chamber and entering the first chamber have completely reacted to form the desired product. Then, the volume "stored" in the first chamber is directed into a collection vessel. Note that this temporary storage represents a "discontinuous step" in a continuous process. In all other portions of the continuous process chemical processing system fluid is continually moving through the system. However, in the individual chambers of residence time chamber module 10, that continuous flow of fluid is halted. Note that it is critical for the total aggregate volume of all individual chambers within residence time chamber module 10 to be sufficient such that the continuous flow of mixed reactants and product out of the reaction chamber is not interrupted. In other words, as the chamber currently being filled approaches capacity, another chamber should be available into which the additional mixed reactants and product are directed.

Referring once again to FIG. 1, a mixed reactants inlet port 14 is coupled in fluid communication with the outlet port of an existing chemical processing system (not separately shown). An inlet valve 22 is used to select one of a plurality of residence time chambers 26, which may be configured to each provide the same or different residence times. It is within one of residence time chambers 26 that the already mixed reactants are held for a period of time that is sufficient to ensure that the reactants have completely reacted, generating a desired product. It should be noted that in a traditional residence time chamber, it is the volume of the residence time chamber that determines the additional residence time provided. However, in residence time chamber module 10, an outlet valve 24 is in fluid communication with the plurality of residence time chambers 26, to selectively control whether any of the residence time chambers is coupled to a product outlet port 16. By keeping outlet valve 24 in a closed position relative to selected ones of the residence time chambers, the mixed reactants can be held within any of residence time chambers 26, for any desired period of time before outlet valve 24 is actuated to enable the completely reacted product to exit via through product outlet port 16. The selected residence time is thus not limited to the time required for reactants to traverse the volume of the residence time chamber at a given flow rate.

The plurality of residence time chambers 26, inlet valve 22, and outlet valve 24 are enclosed within a housing 12. A heat transfer media inlet port 18 provides access for a heat transfer media to enter housing 12, flow through the housing, and exit through a heat transfer media outlet port 20. The heat transfer media modifies the temperature within housing 12, as a function of the temperature of the heat transfer media and its flow rate. For example, the heat transfer media can be supplied at a temperature appropriate to ensure that the temperature within housing 12 is maintained at substantially the same temperature as within the reaction chamber of the chemical processing system to which residence time chamber module 10 is coupled. In this case, the mixed reactants being held within any of residence time chambers 26 are maintained at an optimum reaction temperature. Alternatively, the temperature of the heat transfer media can be tempered to provide a warmer or cooler environment inside housing 12 than the temperature of the reaction chamber, as appropriate for the specific reaction that is going to completion with the residence time chamber module. Preferably, housing 12 is insulated to minimize thermal gains or losses. The spent heat transfer media flows out through heat transfer media outlet port 20 and can optionally be recycled through a heat exchanger or other temperature modifying apparatus to achieve a desired temperature before being returned through heat transfer media inlet port 18.

It is not critical that inlet valve 22 and outlet valve 24 be disposed within housing 12, but it is important that residence time chambers 26 are disposed within housing 12, to enable the temperatures of the mixed reactants within any of the residence time chambers to be maintained at a desired optimal temperature. However, if inlet valve 22 and outlet valve 24 are fabricated from a highly thermally conductive material, and if these valves are not disposed within housing 12, then undesirable thermal changes could be imparted to reactants/products passing through the valves. Disposing the body of the valves within housing 12, while leaving a selector portion of the valves outside the housing so that a operator can manipulate the selector portion to select a residence time chamber, should help to minimize such a possibility.

Also illustrated in FIG. 1 are a plurality of optional elements that can be included in various alternative preferred embodiments of residence time chamber module 10. While these optional elements are not required, it is expected that embodiments including these elements will be particularly useful, depending upon the type of reaction with which the residence time chamber module is used. For example, inlet valve 22 and outlet valve 24 can be selectively operated manually, but automating the process would be preferable and would avoid the need for an operator to closely monitor the process. A prime mover 28 is thus optionally included in residence time chamber module 10 to automatically actuate inlet valve 22 and outlet valve 24 in response to control instructions received from a control module 32. Optionally, a separate prime mover can be provided for each of the inlet valve and the outlet valve. A power bus/data bus 30 controllably connects control module 32 to prime mover 28, so that the prime mover receives the control signals from the control module and is energized with electrical power to actuate one (or both) of the inlet valve and the outlet valve in response to the control signals.

Power bus/data bus 30 preferably provides electrical power to energize prime mover 28, when connected to an external power supply 38a, either directly (not shown) or through control module 32. Preferably, power supply 38a, which is of generally conventional design, also provides electrical power to control module 32. Both electrical power and data (e.g., control signals) are conveyed through conductors 40 that electrically and operatively couple control module 32 to residence time chamber module 10. Residence time chamber module 10 can alternatively be coupled to a separate power supply 38b that provides its required electrical power. For systems in which the electrical demands of residence time chamber module 10 are modest, it is more convenient for residence time chamber module 10 to be energized with an electrical current supplied from power supply 38a via the control module and conductors 40. When the electrical demand of residence time chamber module 10 is relatively high, it will likely be more convenient to couple residence time chamber module 10 to separate power supply 38b. It is anticipated that prime mover 28 will comprise an electric stepping motor or a solenoid, and that inlet valve 22 and outlet valve 24 will be actuated by the prime mover (or by two separate prime movers). Furthermore, the prime mover can be an integral part of each of inlet valve 22 and outlet valve 24. However, it is contemplated that other means, such as pneumatic or hydraulic actuators, coupled to a suitable fluid supply and to the control module, can alternatively be beneficially employed to actuate the inlet and outlet valves to select between the plurality of residence time chambers 26.

A suitable chemical processing system with which residence time chamber module 10 can be used and a suitable control module have been described in a commonly assigned co-pending U.S. patent application, Ser. No. 09/578,224, entitled "MODULAR CHEMICAL PRODUCTION SYSTEM INCORPORATING A MICROREACTOR," which was filed on May 24, 2000, the specification and drawings of which are hereby specifically incorporated herein by reference. That application describes details of the control module, which includes an intuitive operator interface, enabling an operator to select from a stored menu of desired chemical products, so that after selecting a desired amount of a particular product, the operator is only required to connect the system to a source of the required chemicals. The control module controls the chemical processing system according to stored processing parameters, such as flow rates, temperatures, and pressure, to produce the desired selected product.

However, it should be understood that residence time chamber module 10 is readily adapted to be controlled by other types of control modules. Many other suitable microprocessor based control modules can be employed for this purpose, or an application specific integrated circuit (ASIC) control module can be employed.

In the above referenced co-pending patent application, a configuration for housing 12 is described that enables different types of modules to be quickly and efficiently coupled together to form a complete chemical processing system. For use with this chemical processing system, housing 12 of residence time chamber module 10 will preferably be configured as described for other modules of the system, so that residence time chamber module 10 can readily be incorporated into the chemical processing system. However, for other applications of the present invention, the configuration of housing 12 is not so important.

FIG. 1 indicates that power bus/data bus 30 is optionally connected to each residence time chamber 26. It is anticipated that one or more different types of sensors can be beneficially disposed in each residence time chambers 26 (see FIG. 10, for example), and that such sensors will transmit sensor data to control module 32 via power bus/data bus 30.

An optional additional processing module 34 is also illustrated in this Figure. In many cases, the completely reacted product exiting residence time chamber module 10 will be transferred directly to a product collection reservoir (not shown). In some cases, such as in the step wise production of a final desired product that requires multiple processing steps, the product exiting residence time chamber module 10 will not be the final desired product, but rather an intermediate product. In such cases, the intermediate product will be input to additional processing module 34, for further processing.

Residence time chamber module 10 can also include optional process enhancement means 36. While traditionally a residence time chamber module maintains a constant temperature and provides sufficient time for already mixed, incompletely reacted reactants to completely react to form a desired product, additional processing functions can be executed by process enhancement means 36. Details regarding the process enhancement means are provided below in connection with the description of FIGS. 14 and 15. While FIG. 1 shows process enhancement means 36 operatively connected to only three residence time chambers 26, it should be understood that process enhancement means 36 can be connected to more or fewer of residence time chambers 26. Further, various different process enhancement means 36 can be included in housing 12 and can be applied to different residence time chambers, or more than one type of process enhancement means can be applied to a single residence time chamber. Of course, the number of process enhancement means included within housing 12 is a function of the size of the housing, and for a residence time chamber module having a modest size, the different process enhancement means 36 that are included within housing 12 will be limited.

FIG. 2A illustrates a first preferred embodiment of a residence time chamber assembly 44a, which includes four residence time chambers (specifically, two residence time chamber 26a, and two residence time chambers 26b), and two supports 46a located at each end of the residence time chambers. While only three residence time chambers are visible in FIG. 2A, FIG. 2B clearly illustrates the four residence time chambers in residence time chamber assembly 44a. Note that residence time chambers 26a are smaller in cross-sectional size and volume than residence time chambers 26b.

The types and quantities of the product(s) being produced by the chemical processing system to which residence time chamber module 10 is coupled will determine the number and size (volume and/or length) of residence time chambers disposed in a specific residence time chamber module. If the chemical processing system is to produce a constant flow of the same desired product, then a plurality of identically-sized residence time chambers will likely be appropriate. If the chemical processing system is producing different size batches of the desired product, or different products in differing batch sizes, then different-sized residence time chambers, each matched to a particular size batch/product, are appropriately employed. Preferably residence time chambers 26, inlet valve 22, and outlet valve 24 are fabricated from a chemically inert material, such as stainless steel, plastic, polymer coated materials, or TEFLON™ coated materials.

It should be noted that supports 46a can be disposed at the ends of residence time chambers 26 or at other locations along the length of the residence time chambers. Those of ordinary skill in the art will readily understand that a variety of different support structures can alternatively be provided that will function equally as well. For example, the supports can be square in shape rather than circular. While a single relatively wide support 46a can be used, it is less preferable to do so, since the larger size of the support might prevent the heat transfer media from being in contact with too great a portion of the surface area of the residence time chambers. It is important that the heat transfer media contained within housing 12 contact most of the surface area of the residence time chambers, to ensure that good heat transfer with the reactants contained therein is achieved. Finally, it should be noted that residence time chamber supports can be formed integral to the housing, or eliminated entirely by using the mounted inlet valve and the outlet valve to support the residence time chambers.

The residence time chamber assembly can readily be removed from housing 12, so that a different residence time chamber assembly, incorporating a different configuration of residence time chambers, can be inserted in the housing instead. This capability enables a single residence time chamber module to accommodate a wider variety of different chemical processes and combinations. Suitable means are employed to connect the plurality of residence time chambers to the supports. For example, a sufficiently close tolerance between the opening in the supports and the outer diameter of the residence time chambers will facilitate a press fit mount. Or for permanent residence time chamber assemblies, the residence time chambers can be welded to the supports, or secured using suitable adhesives. For residence time chamber assemblies in which it is desirable to be able to remove individual residence time chambers, the residence time chambers can be attached to the supports using standard fluid tubing fittings common to chemical laboratories, such as those provided by the Swagelok Company (http://www.swagelok.com). Preferably, the residence time chamber assembly is sealably and removably connected to the inlet and outlet valves.

FIGS. 3A and 3B illustrate a second preferred embodiment of a residence time chamber assembly 44b. Note that residence time chamber assembly 44b includes a larger number of residence time chambers 26c than the first embodiment. When more residence time chambers are available (of a given size), a longer residence time can be achieved by residence time chamber module 10 without interrupting the flow through the chemical processing system to which the residence time chamber module is connected.

By using outlet valve 24 to close off selected residence time chambers, mixed reactants exiting a reactor or reaction chamber can be held within each of the selected residence time chambers for as long as required to complete the reaction. However, once all the residence time chambers are filled, either outlet valve 24 must be opened to withdraw product from successive residence time chambers, or the flow of reactants through the chemical processing system must be halted or interrupted. Assuming that a flow rate of 10 ml per hour is appropriate for the reaction and chemical processing system with which residence time chamber module 10 is being used and that the volumes of the eight residence time chambers 26c in residence time chamber assembly 44b are each 10 ml, the total operating fluid capacity of the residence time chamber module (excluding the volume of the inlet and outlet valves) is 80 ml. Ignoring the time required to fill and empty each residence time chamber, if a residence time of more than eight hours is required, then residence time chamber assembly 44b cannot achieve a continuous reactant product flow rate of 10 ml per hour, because the chemical processing system would continue supplying mixed reactants to the assembly before any of the eight residence time chambers 26c had retained the mixed reactants for the required eight hours of residence time. Either fluid must be withdrawn from a residence time chamber before the required time, or the fluid flow within the chemical processing system must be interrupted. Neither option is satisfactory.

However, by using a residence time chamber assembly incorporating more residence time chambers (of the same volume), longer residence times can be provided for continuous flow chemical processing systems. Preferably, the available fluid volume for residence time chambers assemblies are matched to specific chemical processing system flow rates, required residence times, and reactions, so that the required parameters can be achieved. It should also be understood that when fabricating a residence time chamber assembly, the number and volume of each of the plurality of residence time chambers can be selected to meet the particular requirements of a given chemical processing system, and reaction. If fabricating a custom residence time chamber assembly is not a viable option, then a plurality of differently configured residence time chamber assemblies, having different total volume capacities, can instead be provided, and the most appropriate available residence time chamber assembly can be selected for a given chemical processing system, required residence time, and reaction.

Figure 11:
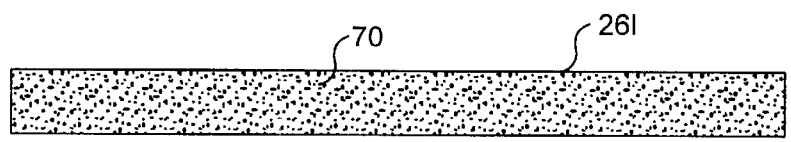
FIG. 11 is a schematic view of a residence time chamber filled with a packing material to enhance a reaction to form a desired product.

While residence time chamber modules with various-sized residence time chambers can be provided to accommodate a wide range of process volumes in accord with the present invention, residence time chamber module 10 is particularly useful in conjunction with a microreactor based chemical processing system, as noted above. For such use, the residence time chambers are expected be of a relatively small size, because the volumes of materials being processed in a micro-scale reactor are relatively small. A particularly useful microreactor is described in a commonly assigned co-pending U.S. patent application, Ser. No. 09/496,999, entitled "MINIATURIZED REACTION APPARATUS," which was filed Feb. 3, 2000, the specification and drawings of which are hereby specifically incorporated herein by reference. A suitable residence time chamber configuration for use in conjunction with such a microreactor is illustrated in FIG. 11 and is discussed in more detail below. However, it should be understood that this application of the present invention is merely exemplary, and the volumes of the residence time chambers are not limited to micro-scale size. A residence time chamber module 10 for use with a macro-scale system can easily be fabricated, and in such an application, it is expected that the volumes of the residence time chambers and relevant dimensions will be correspondingly larger.

Residence time chambers that are small in size do have a specific advantage. Of course the aggregate volume of all the individual residence time chambers must be sufficient to enable the chemical processing system to operate continuously, but for such micro-scale chemical processing systems as discussed above, correspondingly small sized residence time chambers are practical. For instance, it is anticipated that capillary tubing can be used to fabricate residence time chambers for use with small scale chemical processing systems. One advantage of using small-dimensioned residence time chambers is that such chambers enable a rapid exchange of heat, which is important when the reaction in question is highly exothermic and slow, such that waste heat must be efficiently removed to maintain conditions within the residence time chamber at an optimum temperature. While a number of different valve configurations can be used for inlet valve 22 and outlet valve 24, it is anticipated that a rotary valve is particularly suitable. Rotary valves of the appropriate type are commonly employed in the field of chromatography. FIGS. 4A and 4B illustrate such a rotary valve 48. FIG. 4A illustrates an internal valve fluid passage 52, and openings 50 and 54. Depending on whether rotary valve 48 is used as an inlet valve or an outlet valve, openings 50 and 54 are coupled either to the mixed reactant inlet port or the product outlet port. FIG. 4B illustrates opening 50 and shows fluid passage 52 and opening 54 in phantom view.

FIGS. 5A and 5B illustrate a similar rotary valve 48a that has been sealably attached to a support 46c, which includes a plurality of openings 58 of a size and shape generally corresponding to a size and shape of the outer surface of residence time chambers 26, which are inserted into openings 58. If residence time chambers of a different size and shape are employed, then the sizes and shapes of openings 58 will need to changed to match. Note that generally, the supports are preferably used in pairs in a residence time chamber assembly that includes a plurality of residence time chambers, but in FIGS. 5A and 6A only a single support 46c and a portion of each residence time chamber 26 are shown, to reduce the complexity of the drawings. It should be understood that rotary valve 48a can select any one of four residence time chambers 26.

Rather than using a support, openings 58 can instead be formed directly into valve 48a, eliminating the need for a separate support component. However, if no separate support is included, then the resulting residence time chamber assembly will incorporate an inlet valve and an outlet valve, rather than having the inlet and outlet valves being a part of the residence time chamber module and remaining therewith when a residence time chamber assembly is replaced to provide a different configuration of residence time chambers. This approach increases the cost and complexity of each residence time chamber assembly. Accordingly, fabricating a residence time chamber assembly that uses support elements, rather than supporting the residence time chambers within the valves, is a preferred approach.

FIG. 5A illustrates a rotary valve 48a and residence time chamber support 46c, clearly showing a knob 56, which has been added to make rotary valve 48a easier for an operator to manipulate to select a desired residence time chamber. It should be recognized that other styles of knobs can be used, and the specific size and shape of knob 56 is not particularly relevant, so long as knob 56 can be readily grasped by an operator to actuate rotary valve 48a. Also, other structures formed on the exterior of the rotary valve, such as indentations or ridges, can facilitate manipulation or actuation of the rotary valve. Further, if rotary valve 48a is actuated by prime mover 28, rather than being actuated manually, knob 56 is not required.

In FIG. 5A, valve fluid passage 52 is selectively positioned in fluid communication with one of four residence time chambers 26. Using knob 56, an operator can rotate rotary valve 48a in either a clockwise or a counterclockwise direction until valve fluid passage 52 is in fluid communication with any other desired residence time chamber.

Rotary valve 48a preferably includes an index 60 that provides a visual reference as to the relative location of valve fluid passage 52. As shown, rotary valve 48a also includes markings 1–4 that are disposed on the surface of the valve overlying the locations of the corresponding residence time chambers. Thus, in FIG. 5B, index 60 is pointing to marking numeral 4, clearly providing the operator a visual confirmation that rotary valve 48a is presently selecting the fourth residence time chamber. Note that inscribing markings 1–4 on the exterior of rotary valve 48a will only be useful if it is only used with a residence time chamber assembly with four residence time chambers.

FIGS. 6A and 6B similarly illustrate rotary valve 48a, showing the rotary valve after it has been rotated approximately 90° in a clockwise direction. This rotation causes valve fluid passage 52 to be in fluid communication with a different residence time chamber 26.

Figure 7:
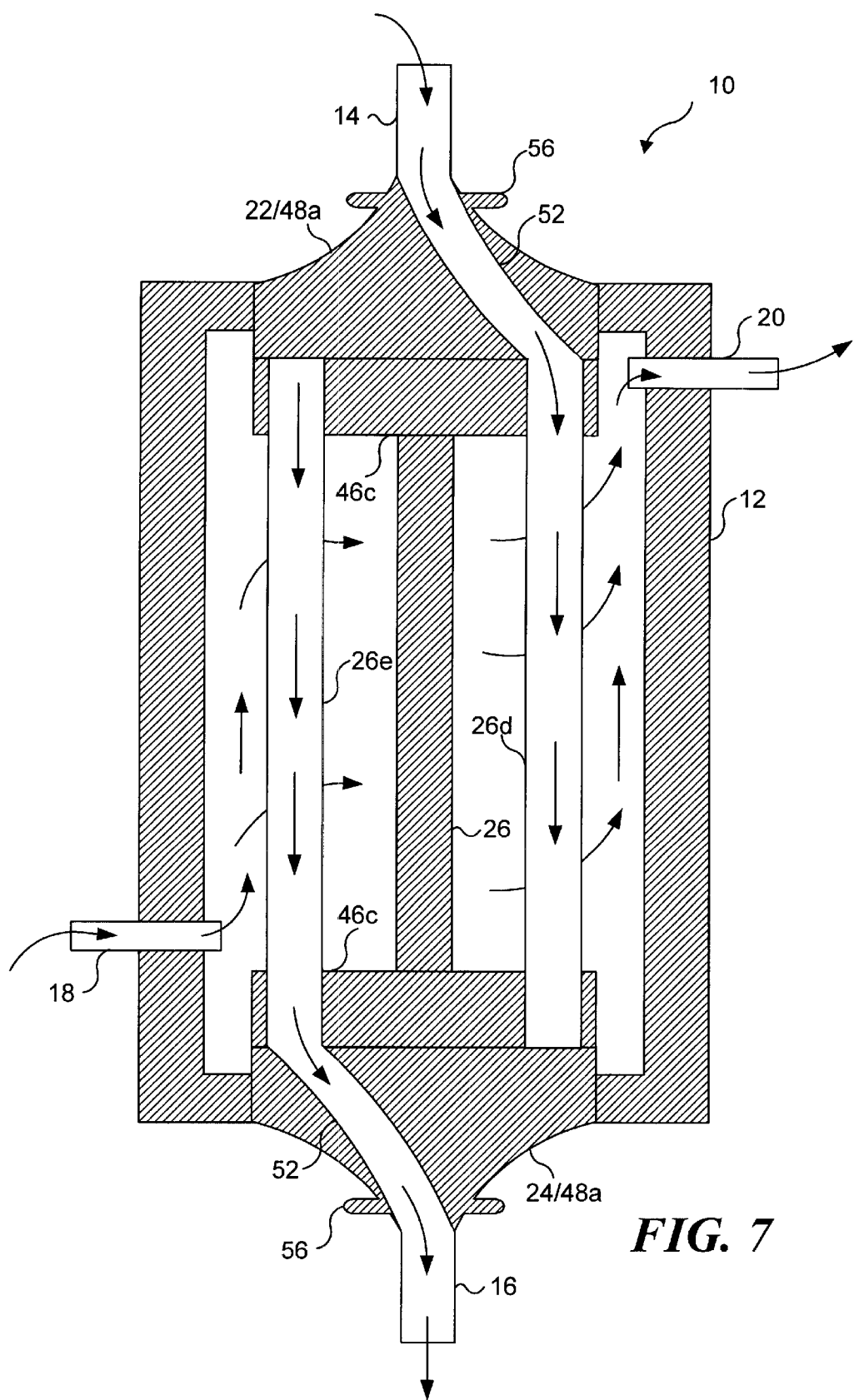
FIG. 7 is a cross-sectional view of residence time chamber module (a portion of which was shown in FIGS. 5A, 5B, 6A, and 6B), two rotary valves as illustrated in these Figures, an insulated housing, and a heat transfer media inlet and outlet.

FIG. 7 is a cross-sectional view of residence time chamber module 10 that incorporates two rotary valves 48a (one functioning as inlet valve 22 and the other functioning as outlet valve 24) and a residence time chamber assembly that includes two supports 46c and four residence time chambers 26 (note that only three residence time chambers are visible in this view). Mixed reactant inlet port 14 is disposed in fluid communication with an outlet of a reactor in a chemical processing system (not shown). Mixed reactants that have not yet fully reacted enter residence time chamber module 10 via mixed reactants inlet port 14, and flow through valve fluid passage 52 in inlet valve 22/rotary valve 48a. The position of inlet valve 22/rotary valve 48a determines into which one of the plurality of residence time chambers 26 the incoming reactants will flow. As illustrated, incoming mixed reactants flow into a residence time chamber 26d.

If outlet valve 24/rotary valve 48a is positioned to cause valve fluid passage 52 of outlet valve 24/rotary valve 48a to be in fluid communication with residence time chamber 26d, the incoming mixed reactants would unobstructedly flow through residence time chamber module 10. In such a case, the mixed reactants might not reside in residence time chamber module 10 for the length of time required to ensure that the mixed reactants completely react to generate a desired product. In residence time chamber module 10, if the positions of inlet valve 22/rotary valve 48a and outlet valve 24/rotary valve 48a are not aligned when residence time chamber 26d is being filled, the mixed reactants entering residence time chamber 26d do not immediately exit residence time chamber module 10, until a desired residence time has passed, when outlet valve 24/rotary valve 48a is manipulated to select residence time chamber 26d. However, air (or other fluid) disposed within a residence time chamber must be exhausted from the residence time chamber as the residence time chamber is being filled. For this reason, outlet valve 24 must select the residence time chamber being filled, to provide a pathway for the air or other fluid (not the mixed reactants) to be exhausted. Once the residence time chamber has been filled to near capacity by the mixed reactants, the outlet valve can be repositioned to prevent the mixed reactants from exiting the residence time chamber just filled, until the desired residence time has been achieved.

Figure 8A:
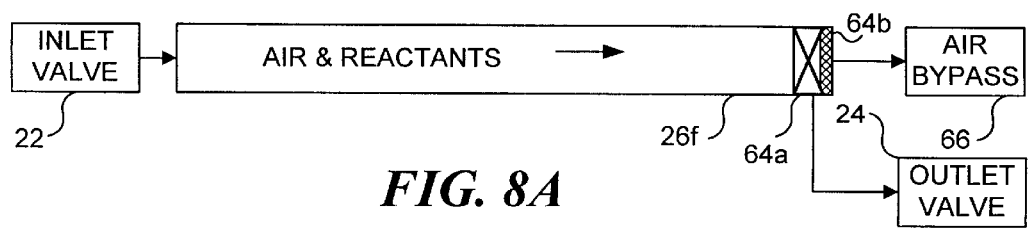
FIG. 8A is a schematic view of a residence time chamber that includes a valve to remove gas from the residence time chamber assembly while filling the residence time chamber with mixed, incompletely reacted reactants.
Figure 8B:
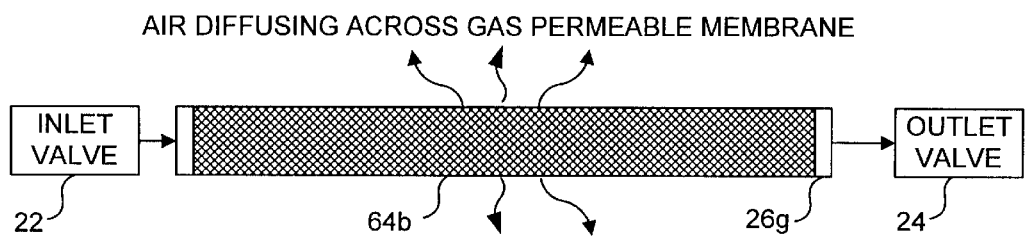
FIG. 8B is a schematic view of a residence time chamber that includes a gas permeable membrane to remove gas from the residence time chamber assembly while filling the residence time chamber with mixed, incompletely reacted reactants.

However, it can be advantageous to position outlet valve 24 in fluid communication with a residence time chamber other than the one currently being filled. In this case, outlet valve 24 can be positioned to select a first residence time chamber from which the desired product will be removed, at the same time inlet valve 22 is being used to fill a second residence time chamber. To accommodate this, other means to evacuate air from the residence time chamber being filled must be employed. For example, prior to filling the second residence time chamber, it can be placed in fluid communication with a vacuum source via outlet valve 24, to remove air from the second residence time chamber. As a further alternative, an air removal valve that allows air (or other gas) to pass while preventing liquid from passing can be incorporated into a residence time chamber 26f, as is shown in FIGS. 8A and 8B. Air or other gas within the second residence time chamber will then exhaust through the air removal valve as the second residence time chamber fills with liquid mixed reactants. Another option to enable a first residence time chamber to be filled simultaneously with the emptying of a second residence time chamber is to provide additional inlet and outlet valves (this option is described in detail below, in conjunction with FIG. 16).

Mixed reactants are introduced into residence time chamber 26f by inlet valve 22 (see FIG. 1). If the volume of residence time chamber 26f is sufficiently larger than the volume of reactants to be introduced into residence time chamber 26f, and the reactants are introduced at sufficient pressure, the air within residence time chamber 26f can be compressed sufficiently so that the air need not be removed. However, it is preferable to not operate the residence time chamber module at high pressures, and further preferable that the volume of residence time chamber 26f be filled only with mixed reactants, instead of with mixed reactants and compressed air. An air removal valve 64 enables air to escape while preventing liquid reactants from escaping, so that outlet valve 24 can be used to release product from the first residence time chamber, while residence time chamber 26f (i.e., the second residence time chamber in the above example) is simultaneously being filled through inlet valve 22.

In a first embodiment illustrated in FIG. 8A, the air removal valve is a two-way valve 64a in combination with a gas permeable membrane 64b, and the air removal valve is disposed at an end of residence time chamber 26f adjacent to outlet valve 22. In its closed position, two-way valve 64a prevents fluid from passing into outlet valve 24, and allows fluid contained within residence time chamber 26f to be in contact with gas permeable membrane 64b. Gas permeable membrane 64b is coupled in fluid communication with an air bypass 66, enabling air or other gas within residence time chamber 26f to escape while preventing liquid mixed reactants or the desired liquid product from escaping. In its open position, valve 64a allows fluid within residence time chamber 26f to exit via outlet valve 24.

In a second embodiment illustrated in FIG. 8B, substantially all of residence time chamber 26g is fabricated from gas permeable membrane 64b. It is anticipated that it will be useful to fabricate the inlet and outlet ends of the residence time chamber from a conventional material to enable standard fittings to be utilized, and that the gas permeable membrane portion of the residence time chamber will extend substantially over the region between these inlet and outlet ends. Air or other gas passing through gas permeable membrane 64b is thus introduced into the heat transfer media filling the interior volume of housing 12 (see FIGS. 1 and 7). The advantage of diffusing the gas into the heat transfer medium is that separate tubing connections to an air bypass 66 and valve 64a are not required. The Millipore Corporation of Bedford, Mass., produces gas permeable membranes that are suitable for use in this embodiment. It should be noted that if the mixed reactants are in the gaseous phase, rather than a liquid phase, the use of a gas permeable membrane is not a feasible solution for exhausting air from the residence time chamber. Further, while gas permeable membranes are available that are impermeable to many different organic and aqueous liquids, it is possible that some mixtures of liquid reactants will not be prevented from escaping residence time chamber 26f by any readily available gas permeable membrane. However, most reactions employ liquid reactants, and gas permeable membranes are available that can be used to block the passage of most liquid reactants, so such an air/gas removal system is expected to be useful.

Gas permeable membrane 64b enables gas generated within residence time chamber 26g as a result of a chemical reaction to be removed. Removal of the gas in this manner is preferable, so long as the gas thus removed is not the desired chemical product being generated by the chemical reaction. Note that the purpose of residence time chamber 26g is to provide sufficient time for the reactants (mixed together in the reactor to which residence time chamber 26g is attached) to completely react; thus, it is anticipated that some gas may be formed in residence time chamber 26g as a result of the completion of such a chemical reaction. When the desired product is a liquid, it is desirable to utilize gas permeable membrane 64b to remove all gas from the desired product. FIG. 7 illustrates residence time chamber 26e, which has previously been filled with mixed, incompletely reacted reactants that have now been retained a sufficiently long time within residence time chamber 26e to ensure that the reaction has been completed, generating the desired product. Because the required reaction time has elapsed, outlet valve 24/rotary valve 48a is rotated so that valve fluid passage 52 of outlet valve 24/rotary valve 48a is aligned with residence time chamber 26e, enabling the completely reacted desired product to exit residence time chamber module 10. Note that air must be allowed to flow through outlet valve 24 into residence time chamber 26e to replace the product being removed during this step. Alternatively, a bypass can be used (such as bypass 66 in FIG. 8A), that introduces air or other gas through inlet valve 22, or the desired product can be removed from the residence time chamber using a vacuum pump connected to outlet valve 24, which produces a vacuum in residence time chamber 26e.

Heat transfer media enters housing 12 through a heat transfer media inlet 18 and fills the internal volume within the housing surrounding the residence time chambers. The heat transfer media ensures that residence time chambers 26 (including 26d/26e), and their contents, are maintained at a desired temperature. The desired temperature will often be substantially the same temperature as that within the reaction chamber of the chemical processing system to which the residence time chamber module is coupled. Spent heat transfer media fluid exits housing 12 via heat transfer media outlet 20. Preferably, housing 12 provides sufficient insulation so that the heat loss through the housing wall is negligible. It will be understood that in the preferred embodiment, a portion of rotary valves 48a are enclosed within housing 12, but if the valves are fabricated out of a material that is minimally thermally conductive, the valves can be disposed outside of housing 12. Valves fabricated from very thermally conductive materials, such as most metals, are likely to cause undesirable heat transfer if disposed outside of housing 12, unless the valves are separately insulated. In all cases, it is preferred that all residence time chambers 26 (including 26d/26e) be bathed in heat transfer media, so that the optimal reaction temperature can be maintained. It is anticipated that temperature sensors can be beneficially incorporated into residence time chamber module 10, to enable an operator (or automated control system) to verify the actual temperature conditions inside the residence time chamber module. Preferably residence time chambers 26, inlet valve 22, and outlet valve 24 are fabricated from a chemically inert material, such as stainless steel, plastic, polymer coated materials, or TEFLON™ coated materials.

By carefully matching the volume capacity of the individual residence time chambers 26 and the number of individual residence time chambers 26 contained within residence time chamber module 10, one can assure that the residence time chamber module has sufficient volume capacity to accommodate an output rate for a specific chemical processing system. For instance, if the chemical processing system provides mixed reactants at a flow rate of 1 ml per minute, a residence time chamber module having ten residence time chambers, each of 10 ml volume will enable a operator to select a duration of 10–100 minutes of residence time without interrupting the continuous operation of the chemical processing system. (Note that at a flow rate of 1 ml/minute, a minimum of 10 minutes is required to fill any one of the residence time chambers). Preferably, the required residence time is equal or greater than the ideal total filling time for all residence time chambers 26 contained in that residence time chamber module.

Residence time chamber module 10 can be used with a chemical processing system that produces different products in sequence. Each of the individual residence time chambers 26 can be filled with a different set of mixed reactants. Under these circumstances, residence time chamber module 10 is preferably flushed with solvent to ensure that no cross-reactions occur among the different desired products. As noted above, it is anticipated that residence time chamber assemblies can incorporate residence time chambers having different volumes, which is expected to be particularly useful when different and/or sequential reactions of different volumes of products are to be carried out.

Figure 9A:
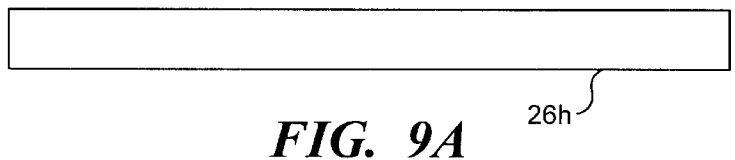
FIG. 9A is a schematic view of a residence time chamber having an elongate shape.
Figure 9B:
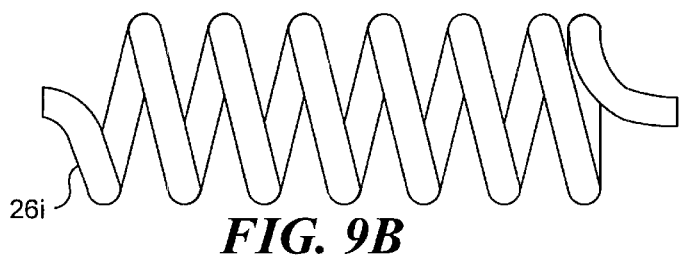
FIG. 9B is a schematic view of a residence time chamber having a coiled shape.
Figure 9C:
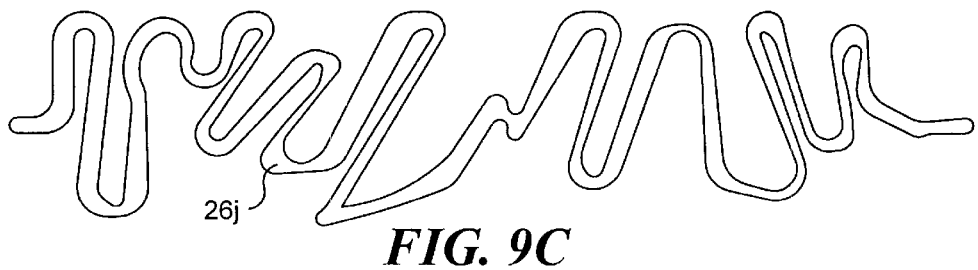
FIG. 9C is a schematic view of a residence time chamber having an irregular shape.

Other embodiments of residence time chambers are likely to be beneficial in carrying out completed chemical reactions. For example, instead of a simple tube, the residence time chambers can be fabricated from long coils of capillary tubing, or relatively thin tubing that follows an irregular path. FIGS. 9A–9C illustrate these different embodiments. In FIG. 9A, a residence time chamber 26h is an elongate tube, providing a generally linear fluid path for the mixed reactants through the residence time chamber. FIG. 9B illustrates a residence time chamber 26i that is configured as a coil, providing a generally helical fluid path for the mixed reactants to flow through the residence time chamber, while FIG. 9C shows a residence time chamber 26j that is quite irregular in shape, changing both direction and diameter at random (or at specified) intervals, presenting an irregular fluid path for the mixed reactants.

Figure 10:
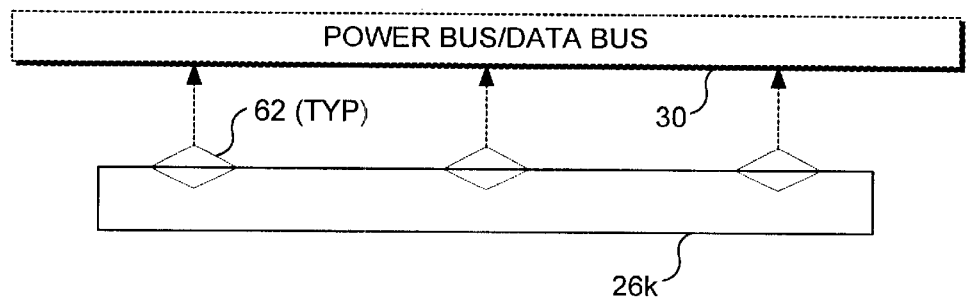
FIG. 10 is a schematic view of a residence time chamber incorporating a plurality of sensors.

As noted above, it is anticipated that certain embodiments will incorporate sensors for detecting a parameter relating to the reactants within a residence time chamber, and will produce a signal indicative of that parameter. FIG. 10 illustrates a residence time chamber 26k that incorporates a plurality of sensors 62. Sensors 62 are electrically coupled to data bus/power bus 30, which in turn, is electrically coupled to a control module 32. In embodiments not incorporating data bus/power bus 30 or control module 32, sensors 62 can be coupled to a simple display (not shown) capable of displaying the relevant data to an operator. It is anticipated that sensors such as temperature sensors, electrochemical sensors, optical sensors, and pressure sensors will be usefully included within the residence time chambers. A single residence time chamber can include a plurality of different types of such sensors.

In at least one embodiment, at least one of the residence time chambers includes structures or components to enhance the desired reaction. FIGS. 11–14 illustrate various different embodiments of residence time chambers that each incorporate different structures or elements for this purpose. FIG. 11 illustrates a residence time chamber 26l that includes a packing material 70. Packing material 70 can comprise an inert packing substance such as glass beads or silica and will provide an enormous surface area within the residence time chamber volume. This increased area will ensure that improved residence time conditions are provided to the reactants within the residence time chamber. Such packing material can also provide separation between a desired product and byproducts, much in the way the packing material in a chromatography column separates components. Packing material 70 can also include catalysts selected to enhance the production of a desired product, or a material such as granular or activated carbon, to selectively filter the reactant mixture into organic and inorganic fractions. Those of ordinary skill in the art will readily recognize that many types of packing material can be used to enhance the processing of the mixed reactants to achieve the desired product within residence time chamber 26l.

Figure 12:
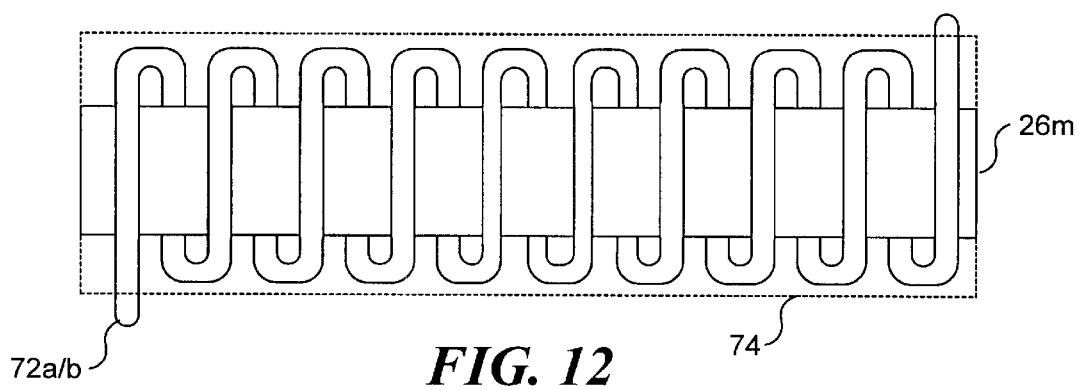
FIG. 12 is a schematic view of a residence time chamber having a heat exchanger to independently modify the temperature of that residence time chamber.

FIG. 12 illustrates a residence time chamber 26m that incorporates a coiled heat exchanger 72a to enable the temperature conditions within residence time chamber 26m to be controlled independently of the other residence time chambers disposed within housing 12. In one embodiment, all residence time chamber disposed within housing 12 include their own individual heat exchangers 72a, enabling a wide variety of different temperatures to be achieved. For instance, a first residence time chamber can be heated to a high temperature, while a second residence time chamber is cooled to a lower temperature. In such an embodiment where wide differences in temperature are desired, housing 12 would not be filled with heat transfer media. In yet another embodiment, housing 12 will be filled with heat transfer media, and heat exchanger 72a will be used to modify the temperature conditions within residence time chamber 26m by a modest amount, over or under the temperature conditions established by the heat transfer media filling housing 12. For instance, in a sequence of reactions that is being processed, it is possible that three reactions might require a temperature A, while a fourth reaction requires a slightly different temperature of A+T degrees (where T is either a positive or negative value). The heat transfer media filling the internal volume of housing 12 can be used to establish temperature A, while heat exchanger 72a can be used to change the temperature conditions within residence time chamber 26m by T degrees. Of course, it is expected that only relatively modest changes in temperature would be achieved in this manner. If heat exchanger 72a and residence time chamber 26m were separated from the heat transfer media filling the interior volume of housing 12 by an optional insulating barrier 74, larger temperature differentials can be achieved. While heat exchanger 72a is not illustrated with an inlet or an outlet, it should be understood that heat exchanger 72a is in fluid communication with a heat transfer media source, and a spent heat transfer media reservoir or a cryostat.

It is further contemplated that heat exchanger 72a can be replaced with an electrical resistive heating element 72b that coils around residence time chamber 26m. Electrical resistive heating element 72b can similarly be used to adjust the temperature conditions within residence time chamber 26m, independently of the temperature conditions of other residence time chambers. Also as described above with respect to heat exchanger 72a, other residence time chambers can be similarly equipped with their own electrical resistive heating element 72b to achieve the same or different temperatures.

While a coiled configuration is expected to be preferred for both heat exchanger 72a and electrical resistive heating element 72b, it should be noted that other embodiments are possible. For instance, coiled heat exchanger 72a could be replaced by a heat exchanger in the form a tube having a diameter larger than that of residence time chamber 26m, such that residence time chamber 26m is substantially enclosed by the tube heat exchanger (not shown). Electrical resistive heating element 76b can be in the form of a flexible tape that is wrapped around substantially all of residence time chamber 26m, or in the form of smaller strips adhered to the exterior of residence time chamber 26m (neither alternative shown).

Figure 13:
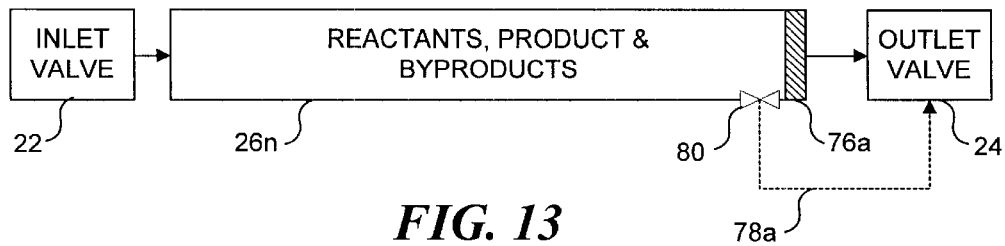
FIGS. 13 and 14 are schematic views of different embodiments of a residence time chamber incorporating a filter.

In FIG. 13 a filter 76a is disposed at the outlet of residence time chamber 26n. After the required residence time, which is sufficient to ensure that all the reactants have reacted to form the desired product, outlet valve 24 is opened and only the desired product is released, leaving only byproduct(s) in the residence time chamber 26n (all the reactants having been reacted, so only product and byproduct(s) remain in the residence time chamber). To remove the byproduct, a solvent back flush can be injected through outlet valve 24, and the byproduct and solvent can then be removed via inlet valve 22. Alternatively, an optional byproduct bypass channel 78a can be accessed by opening an optional valve 80 to remove the byproduct via outlet valve 24. Note that outlet valve 24 can then be used to direct the undesired byproducts to a different collection receptacle than the desired product. In a further alternative configuration, bypass channel 78a can lead directly to a separate waste receptacle (see FIG. 14).

Figure 14:
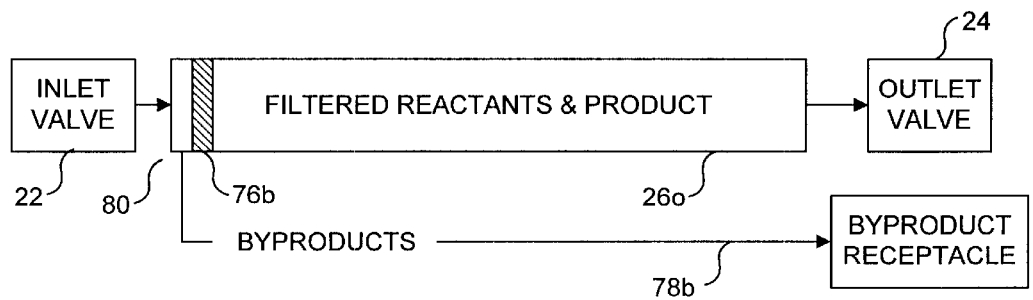

A filter 76b in FIG. 14 is disposed at the inlet end of a residence time chamber 26o. Preferably filter 76b is adapted to separate undesirable byproducts from the desired product and reactants that have not yet reacted. Note that because the inlet of residence time chamber 26o is in fluid communication with the outlet of a chemical reactor, the material exiting the chemical reactor is likely a mixture of product, reactants that have not completely reacted to form the desired product (s), and byproducts. Filter 76b removes any byproducts generated in the chemical reactor, so that no byproducts initially enter residence time chamber 26o, and so that the only byproducts within residence time chamber 26o will be those formed as a result of the reactants entering the residence time chamber reacting within the residence time chamber to form desired products and undesired byproducts. As shown, a small volume of residence time chamber 26o at the inlet end is in fluid communication with inlet valve 22, filter 76b, and bypass 78b. Byproduct entering residence time chamber 26o cannot pass through filter 76b, and is removed via bypass channel 78b, which leads to a byproduct receptacle 81. While not shown, it should be understood that bypass 78*b* can be configured to be in fluid communication with outlet valve 24, which can then be used to direct the undesired byproducts to a different collection receptacle than the desired product. If desired, filter 76*a* as described above with respect to FIG. 13 can also be incorporated into residence time chamber 26*o*.

Depending on the reaction in question, the removal of byproducts from residence time chamber 26*o* by filter 76*b* may improve the yield obtained. Many chemical reactions between reactants can result in more than one specific product and/or byproduct. For instance, isomers are chemical compounds that consist of identical atomic constituents, but have different molecular structures, and often the product of a reaction is a mixture of different isomers. The different molecular structures have different chemical properties, and thus one isomer might be more commercially valuable than another isomer. Understanding the specific mechanics of the chemical reaction and having the ability to manipulate the reaction are keys to controlling the formation of one isomer instead of another. The relative percentages of different reactants, as well as the relative percentages of other compounds present in the reaction mixture, represents one reaction variable that can be manipulated to achieve a desired product. Including filter 76*b* provides a mechanism to manipulate the reaction. It should be noted that filter 76*b* need not be limited to a filter that removes byproducts. Filter 76*b* can be used to remove product from the mixture exiting the chemical reactor to which residence time chamber 26*o* is attached, so that only byproducts and not yet reacted reactants enter the main portion of residence time chamber 26*o*. It is anticipated that filter 76*b* can be used achieve different conditions within the main portion of residence time chamber 26*o* than are found in the reaction chamber of the upstream chemical reactor. Thus, filter 76*b* provides a useful mechanism for controlling a particular reaction to achieve a desired result.

With respect to both filter 76*a* and filter 76*b*, preferably both filters should be removable, such that either filter can be removed from the residence time chamber and replaced with a different filter. Preferably both filters should be renewable, in that either filter should be able to be cleaned while in place. Cleaning can be accomplished by flushing the filter (either a back flush or flushing in the normal direction) with a solvent selected to dissolve any solid reaction products or byproducts adhering to the filter. Note that this solvent may be a different solvent than that used for the back flush described above with respect to FIG. 13, in which a byproduct removing solvent is used to remove byproduct from residence time chamber 26*n*. To renew or clean a filter, the selected filter cleaning solvent preferably should be able to dissolve solids adhering to the filter, a task not necessarily required of the byproduct flushing solvent. Note that the use of an additional type of solvent can require that different inlet and/or outlet valves be provided, depending on whether the filter cleaning solvent is used as a back flush or a forward flush. If the original inlet valve is a two-way valve that enables an individual residence time chamber to be placed in fluid communication with either a mixed reactants inlet or a first solvent supply, and an additional solvent supply is added, a three-way inlet valve should replace the two-way inlet valve to enable the additional solvent supply to selectively be placed in fluid communication with the desired residence time chamber.

Referring to FIG. 13, if inlet valve 22 is kept closed when using a back flush procedure, then the back flush can exit residence time chamber 26*n* via bypass 78*a*, if valve 80 is open. For residence time chamber 26*o* of FIG. 14, the back flush can exit via bypass 78*b*. Note that in one preferred embodiment of the present invention, the relative sizes of the residence time chambers are small, similar in size to a capillary tube. In such an embodiment, it is preferable for valve 80 to be disposed immediately adjacent to filter 76*a*, as shown in FIG. 13.

Figure 15:
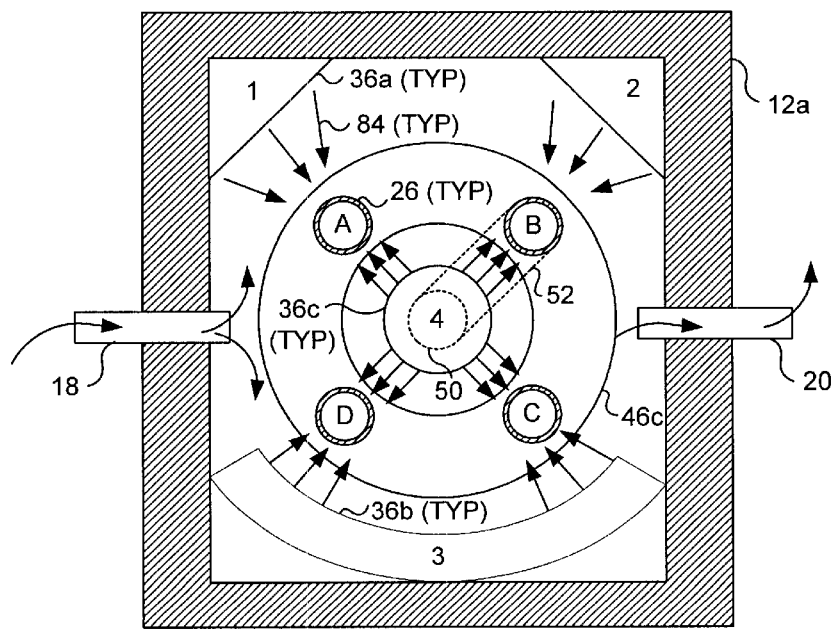
FIG. 15 is a cross-sectional view of a residence time chamber module in accord with the present invention, which incorporates process enhancement means to enhance the production of a desired product.

Means for enhancing the reaction generating the desired product can also be incorporated into housing 12. It is anticipated that such means may include a source of electromagnetic radiation, a source of sonic radiation, a source of alpha radiation, a source of beta radiation, a source of gamma radiation, a source of X-rays, a source of other radioactive particles, a source of charged particles, a source of light, a source of thermal energy, an electric field source, and a magnetic field source. With respect to the source of thermal energy, an electric resistive heating element is preferred. Such means can be configured to affect all residence time chambers disposed within the housing, or to affect only selected residence time chambers. FIG. 15 is a cross-sectional view of a housing 12*a* that incorporates a plurality of processing means 36, which enhance a chemical reaction by providing an appropriate form of energy (i.e., from one or more of the sources listed above) to the reactants within residence time chambers 26. Energy 84 radiates from process enhancement means 36 towards residence time chambers 26. Note that residence time chambers 26 must be fabricated from a material that is substantially transparent to the energy provided by process enhancement means 36 for a benefit to be realized. For instance, if process enhancement means 36 emits light, then the residence time chamber 26 to which the light is directed must be fabricated from a substantially optically transparent material. The positions of heat transfer media inlet 18 and heat transfer media outlet 20 have been changed relative to their respective positions in FIG. 7, to enable housing 12*a* to accommodate process enhancement means 36.

FIG. 15 shows four process enhancement means 36, labeled 1, 2, 3 and 4. Each of these process enhancement means can be identical, e.g., each means can be a source of charged particles. Preferably, each of the process enhancement means is individually selectively energized, such that energy can be selectively applied to a desired residence time chamber. Note that process enhancement means 36*a* (means #1 and means #2) are configured to apply energy primarily to residence time chambers A and B respectively, while process enhancement means 36*b* (means #3) is configured to selectively apply energy to residence time chambers C and D, and process enhancement means 36*c* (means #4) is configured to selectively apply energy to residence time chambers A–D. For embodiments in which it is desirable to simultaneously apply energy to all residence time chambers, process enhancement means 36*c* (means #4) is preferred.

Means #1–4 need not be identical. For instance, means #1 can be a source of light, applying light energy to the residence time chamber labeled A, while means #3 can be a source of charged particles, applying those particles to the residence time chambers labeled C and D. The process enhancement means can incorporate focusing elements, to ensure that the majority of the energy emitted is directed toward the desired residence time chamber 26. Preferably, the process enhancement means are of a length that is substantially equal to the lengths of residence time chambers 26, so that the energy is applied to substantially the entire volume of each individual residence time chamber. In system embodiments that are automatically controlled by a control module, the process enhancement means are also preferably connected to and controlled by the control module. It is also preferable that the process enhancement means be removable and replaceable, such that an operator can replace one means with a different means more suitable for enhancing a particular reaction. If only one type of process enhancement means is required, instead of providing multiple means, it is anticipated that the residence time chamber assembly will be rotated by an optional prime mover (not shown), so that any of the residence time chambers within a given residence time chamber assembly can be selectively positioned to be treated by a specific process enhancement means. This embodiment is expected to be particularly useful when process enhancement means apply relatively short bursts of energy to each residence time chamber, and the residence time chamber assembly includes many residence time chambers, so that including a single process enhancement means for each residence time chamber is not practical.

It is anticipated that a single residence time chamber within a residence time chamber module will be used repetitively. To increase the quality and yield of the desired product, it is preferable to flush each individual residence time chamber, and the inlet and outlet valves, before and after each such use. Further, as noted above, it is anticipated that it will be extremely useful to enable a user to simultaneously fill a first residence time chamber and to empty (or flush) a second residence time chamber. A preferred embodiment that supports such an operation includes multiple inlet valves and multiple outlet valves. Residence time chamber module 10a of FIG. 16 incorporates an additional inlet and outlet valve that facilitate the task of filling, flushing, and emptying individual residence time chambers. While a solvent supply and spent solvent reservoir can be coupled to a single inlet and outlet valve, using two inlet and outlet valves enables one inlet valve and outlet valve pair to be used for flushing or removing product, while the other inlet and outlet valve pair is used to fill a residence time chamber. Note that unless the residence time chamber is equipped with an air removal system, such as described in connection with FIGS. 8A and 8B, an outlet valve must be used during filling and flushing to remove air from the residence time chamber being filled. Furthermore, to remove product from a residence time chamber, one inlet valve must be used in conjunction with one outlet valve, to enable air to replace the fluid being removed.

Figure 16:
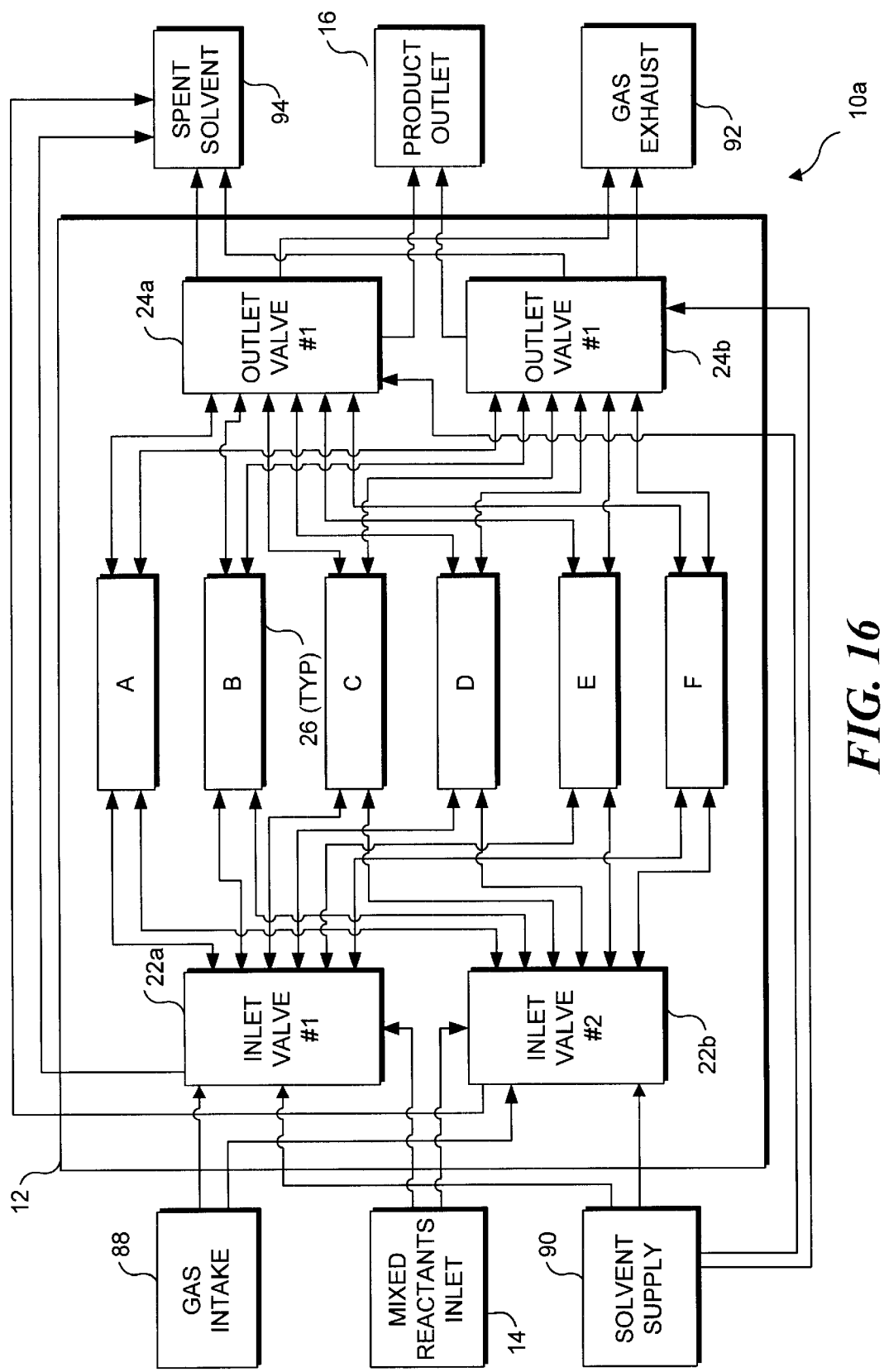
FIG. 16 is a block diagram of the functional elements of an embodiment of the present invention that employs paired inlet and outlet valves.

FIG. 16 also illustrates a solvent supply 90, a spent solvent reservoir 94, a gas intake 88, a gas exhaust 92, paired inlet valves 22a and 22b, and paired outlet valves 24a and 24b. While the heat transfer media inlet and outlet, and the optional elements of FIG. 1 have not been shown, it should be understood that these elements can and likely will be included in residence time chamber module 10a, and they have been omitted merely to simplify the Figure. Note that residence time chambers 26 have been labeled A–F, to illustrate how the different inlet and outlet valves are used to simultaneously fill and flush two different residence time chambers (or to fill and empty two different residence time chambers, or to empty and flush two different residence time chambers).

Assume that inlet valve 22a is actuated to select residence time chamber A and mixed reactants inlet 14. To enable air to be removed from residence time chamber A so that the mixed reactants can completely fill the residence time chamber, either outlet valve 24a or 24b needs to be actuated to select both residence time chamber A and gas exhaust 92 (unless the air is removed by other means, such as evacuating the residence time chamber with a vacuum source, or by employing a residence time chamber with an air removal valve, as discussed above in connection with FIGS. 8A and 8B). By actuating outlet valve 24a to be in fluid communication with residence time chamber A and gas exhaust 92 at the same time that inlet valve 22a is in fluid communication with residence time chamber A and mixed reactants inlet 14, air displaced by the mixed reactants flowing into the residence time chamber will escape through gas exhaust 92, so that all of the volume of residence time chamber A can be filled with mixed reactants from mixed reactants inlet 14. Note that outlet valve 24b can be used to accomplish this task instead of outlet valve 24a.

At the same time, inlet valve 22b can be actuated to select any of the other residence time chambers B–F, to either flush the thus selected residence time chamber with solvent or to introduce air or gas into the residence time chamber so that the completely reacted product can be removed through outlet valve 24b. For example, assume that an operator (or a microprocessor executing a software program in an automated system) determines that residence time chamber B needs to be flushed with solvent while residence time chamber A is being filled as described above. Inlet valve 22b is actuated to select residence time chamber B and solvent supply 90, while outlet valve 24b is actuated to select both residence time chamber B and spent solvent reservoir 94. Solvent will now flow from solvent supply 90, through inlet valve 22b, into residence time chamber B, and out through outlet valve 24b and into spent solvent reservoir 94. Once the desired volume of solvent has been used to flush residence time chamber B, inlet valve 22b and outlet valve 24b are closed, and residence time chamber B is clean and ready for a new batch of mixed reactants to be introduced.

Note that inlet valves 22a and 22b, and outlet valves 24a and 24b are selectively connected to solvent supply 90 and spent solvent reservoir 94, which enables the residence time chambers in residence time chamber module 10a to be flushed with solvent from either direction, i.e., from the inlet side to the outlet side or vice versa. This feature is especially useful for residence time chambers that include a product filter, such as those illustrated in FIGS. 13 and 14. Because the byproducts can be back flushed from the residence time chambers through an inlet valve, valve 80, which is illustrated in FIGS. 13, is not required.

As a further aspect of the above example, assume that the operator (or the algorithm controlling an automated system) determines that instead of flushing another residence time chamber while residence time chamber A is being filled, the material in residence time chamber C has been retained in residence time chamber C sufficiently long so that the now completely reacted product needs to be removed. Inlet valve 22b is actuated to select residence time chamber C and gas intake 88, while outlet valve 24b is actuated to select both residence time chamber C and product outlet 16. Note that as the desired product is removed from residence time chamber C, air or gas must be introduced into residence time chamber C to make up for the volume of desired product being withdrawn from the residence time chamber. To enable air to flow into the residence time chamber, gas intake 88 can simply be connected to ambient atmosphere, although it is anticipated that filtering the ambient air before introducing it into residence time chamber C will be preferred. Suitable air filtering systems are well known in the art. Alternatively, gas intake 88 can be connected to a pre-cleaned gas supply, such as a pressurized gas cylinder of pre-filtered air, or to a supply of an inert gas such as nitrogen. Again, suitable clean gas supply systems of this type are well known in the art.

The steps for filling residence time chamber A, flushing residence time chamber B, and removing product from residence time chamber C in the example described above can be performed in any combination of two simultaneous processes, on any two residence time chamber, by using one inlet valve and one outlet valve for each process step. Thus, the incorporation of an additional inlet valve and an additional outlet valve greatly enhances the flexibility of the residence time chamber module.

Regardless of which embodiment is employed (residence time chamber module 10 or residence time chamber module 10a), before the unit is first used, it is preferably flushed with solvent, such that all individual residence time chambers are filled with solvent, to ensure that no undesired contamination of the product or undesired cross reactions occur. The individual residence time chambers are then each consecutively filled (in whatever order desired) with the reaction mixture exiting the reaction chamber of the chemical processing system (the mixed reactants and likely some product and byproducts). After product is removed from an individual residence time chamber, that chamber is flushed with solvent, so that it can again be filled the reaction mixture exiting the reaction chamber of the chemical processing system.

Figure 17:
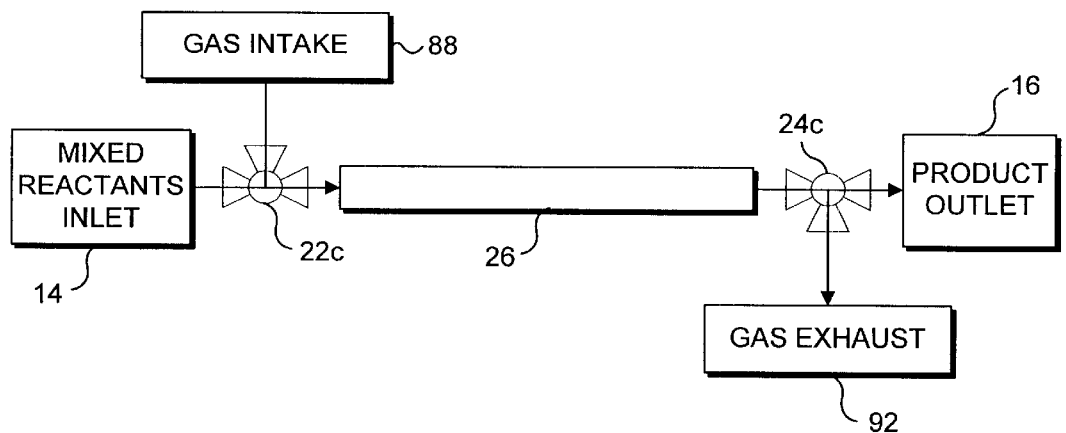
FIG. 17 is a block diagram of the functional elements of an embodiment of the present invention that equalizes pressure within individual residence time chambers using three-way valves.
Figure 18:
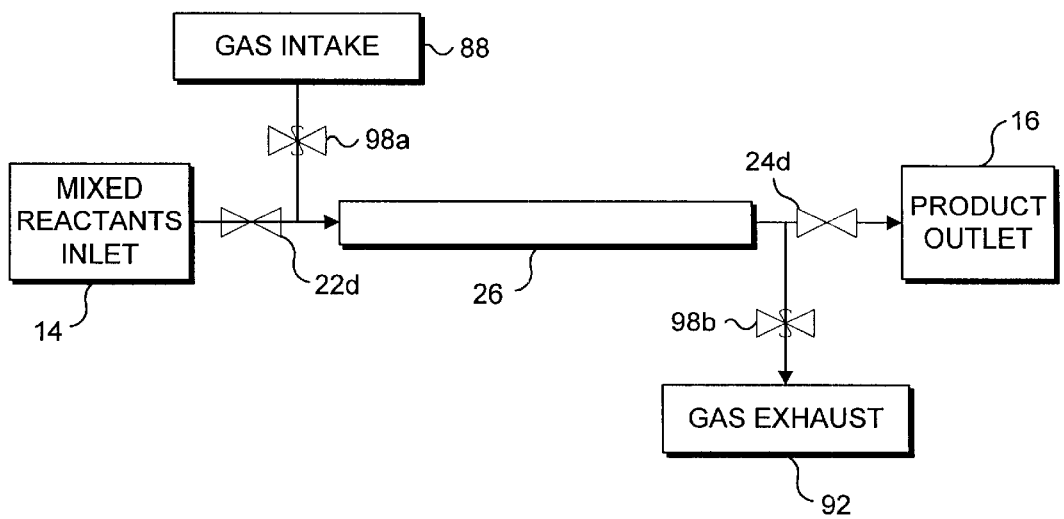
FIG. 18 is a block diagram of the functional elements of an embodiment of the present invention that equalizes pressure within individual residence time chambers using automatic pressure relief valves.

As discussed above, when both filling and emptying an individual residence time chamber, it is preferable to provide a mechanism to equalize the pressure within each residence time chamber. While mixed reactants could be introduced into residence time chambers under high pressure, thereby compressing any gas contained within the residence time chamber, and product can be removed by pumping, leaving a vacuum within the residence time chamber, it is preferable to avoid such pressure extremes when possible. Requiring each residence time chamber, and the associated inlet and outlet valves to accommodate such pressure fluctuations is likely to increase costs and result in pressure leaks after extended use. Several different valve configurations enable the residence time chambers to be filled and emptied without building up high pressure or vacuum. While FIGS. 17 and 18 illustrate only a single residence time chamber, it should be understood that the valve configurations discussed with respect to these Figures can be applied to residence time chamber modules that include a plurality of individual residence time chambers (see FIGS. 1 and 16). Further, the valve configurations discussed below can be used in conjunction with residence time chamber modules that employ a single inlet valve and a single outlet valve (FIG. 1), as well as with residence time chamber modules that employ multiple inlet valves and multiple outlet valves (FIG. 16).

A first configuration that enables a gas to be removed or introduced into a residence time chamber when filling or emptying that residence time chamber uses three-way valves for both the inlet and outlet valves. When filling residence time chamber 26 of FIG. 17, a three-way inlet valve 22c is in fluid communication with mixed reactants inlet 14 and residence time chamber 26, while a three-way outlet valve 24c is in fluid communication with gas exhaust 92 and residence time chamber 26. As the mixed reactants exiting the reaction chamber of the chemical processing system that the residence time chamber module is connected to enter residence time chamber 26, any gas within the residence time chamber is forced out of the residence time chamber and into gas exhaust 92. When residence time chamber 26 is full, both three-way inlet valve 22c and three-way outlet valve 24c are closed, thus isolating residence time chamber 26. After sufficient time has elapsed to allow all of the reactants within residence time chamber 26 to completely react to generate the desired product, three-way outlet valve 24c is manipulated so that residence time chamber 26 is in fluid communication with product outlet 16. At the same time, three-way inlet valve 22c is manipulated so that residence time chamber 26 is also in fluid communication with gas intake 88. As the completely reacted product exits residence time chamber 26, an equal volume of gas from gas intake 88 enters the residence time chamber, thus equalizing the pressure within the residence time chamber. While three-way valves 22c and 24c can be manipulated manually, preferably the valves are controllably connected to a prime mover and control module, as shown in FIG. 1. Three-way valves 22c and 24c can be incorporated into residence time chamber module 10 of FIG. 1, if gas intake 88 and gas exhaust 92 are also incorporated into residence time chamber module 10. Three-way valves 22c and 24c can also be incorporated into a residence time chamber module that includes multiple inlet and outlet valves (such as residence time chamber module 10a of FIG. 16). Note that if such a residence time chamber module incorporates the solvent supply system of FIG. 16, four-way valves, rather than three-way valves, are required. However, the pressure equalization described with respect to the three-way valves of FIG. 17 would be functionally equivalent for four-way valves.

A second configuration that enables a gas to be removed or introduced into a residence time chamber when filling or emptying that residence time chamber uses pressure sensitive valves in fluid communication with the gas intake and gas exhaust, and also in fluid communication with the residence time chamber. Note that these pressure sensitive valves are in addition to the inlet and outlet valves that are respectively in fluid communication with the mixed reactants inlet and the product outlet. When filling residence time chamber 26 of FIG. 18, a two-way inlet valve 22d is in fluid communication with mixed reactants inlet 14 and residence time chamber 26, while a pressure sensitive valve 98b is in fluid communication with gas exhaust 92 and residence time chamber 26. As the mixed reactants flow through inlet valve 22d and enter the residence time chamber, pressure within the residence time chamber increases. This increase in pressure automatically causes pressure sensitive valve 98b to open, and any gas within the residence time chamber is forced out of the residence time chamber and into gas exhaust 92. When inlet valve 22d is closed, the pressure within residence time chamber 26 no longer is increasing, and pressure sensitive valve 98b closes. After sufficient time has elapsed to allow all of the reactants within residence time chamber 26 to completely react to generate the desired product, two-way outlet valve 24d is manipulated so that residence time chamber 26 is in fluid communication with product outlet 16. As product exits residence time chamber 26, a partial vacuum is created. In response to this partial vacuum, pressure sensitive valve 98a automatically opens, and gas from gas intake supply 88 enters residence time chamber 26 to equalize the pressure. Once two-way outlet valve 24d is closed, and the volume of residence time chamber 26 is filled with gas at standard pressure, pressure sensitive valve 98a automatically closes. As noted above, two-way valves 22d and 24d can be manipulated manually, but preferably are controllably connected to a prime mover and control module, as shown in FIG. 1, so that they are automatically controlled. Pressure sensitive valves 98a and 98b automatically open and close in response to changing pressure conditions within residence time chamber 26, and thus, do not need to be similarly connected to a prime mover or control module. Note that if pressure sensitive valves 98a and 98b are incorporated into residence time chamber module 10a of FIG. 16, the four-way inlet and outlet valves (inlet valve 22a, inlet valve 22b, outlet valve 24a and outlet valve 24b) of residence time chamber module 10a can be replaced with three-way valves, such that the three-way inlet valves are selectively in fluid communication with solvent supply 90, mixed reactants inlet 14, and residence time chambers 26, and so that the three-way outlet valves are selectively in fluid communication with spent solvent reservoir 94, product outlet 16, and residence time chambers 26. In such a case, the pressure equalization described with respect to the pressure sensitive valves of FIG. 18 would be functionally equivalent for the three-way inlet and outlet valves. Although the present invention has been described in connection with the preferred form of practicing it and modifications thereto, those of ordinary skill in the art will understand that many further modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A variable residence time chamber module providing sufficient residence time for mixed but incompletely reacted reactants exiting from a chemical reactor to completely react to form a desired product, comprising:
   (a) a housing;
   (b) an inlet valve:
   (c) an outlet valve; and
   (d) a plurality of individually addressable residence time chambers disposed within the housing, the plurality of residence time chambers being in fluid communication with the inlet valve, said inlet valve being actuated to couple the mixed but incompletely reacted reactants to a selected one of the plurality of residence time chambers selected with the inlet valve, and said outlet valve being actuated to couple with said selected one of the residence time chambers to withdraw the desired product therefrom, said mixed but incompletely reacted reactants being retained within said selected one of the plurality of residence time chambers for a time required for said reactants to completely react to form the desired product.

2. The variable residence time chamber module of claim 1, further comprising a heat transfer media inlet and a heat transport media outlet disposed within the housing, an inner volume of the housing being substantially filled with heat transfer media supplied from an external source through the heat transfer media inlet, spent heat transfer media being removed from the housing through the heat transfer media outlet.

3. The variable residence time chamber module of claim 1, wherein said housing provides a thermal insulating barrier to assist in retaining said mixed reactants at a desired temperature until the desired product is withdrawn through the outlet valve.

4. The variable residence time chamber module of claim 1, wherein said plurality of residence time chambers comprise at least one of a substantially elongate tube, a coiled tube, and an irregular shaped tube.

5. The variable residence time chamber module of claim 1, wherein said plurality of residence time chambers are fabricated from one of a stainless steel, a plastic, and a polymer coated material.

6. The variable residence time chamber module of claim 1, further comprising at least one additional inlet valve, and at least one additional outlet valve, such that at least one inlet valve is selectively actuatable to couple the mixed but incompletely reacted reactants to a different selected one of the plurality of residence time chambers, and at least one outlet valve is selectively actuatable to couple to yet a still different one of said plurality of residence time chambers to withdraw the desired product therefrom.

7. The variable residence time chamber module of claim 1, wherein said inlet valve and said outlet valve each comprises a rotary valve.

8. The variable residence time chamber module of claim 1, wherein said inlet valve and said outlet valve includes a marking that enables a operator to determine which of said plurality of residence time chambers said inlet valve and said outlet valve are currently selecting.

9. The variable residence time chamber module of claim 1, further comprising a residence time chamber support structure that supports and mounts said plurality of residence time chambers within the housing.

10. The variable residence time chamber module of claim 9, wherein said residence time chamber support structure and said plurality of residence time chambers are readily removable from within the housing and replaceable with a different plurality of residence time chambers that provide different residence times.

11. The variable residence time chamber module of claim 1, further comprising a prime mover drivingly coupled to each of said inlet valve and said outlet valve, such that said inlet valve and outlet valve are automatically actuated to selectively couple to said selected one of the plurality of residence time chambers in response to control signals.

12. The variable residence time chamber module of claim 11, further comprising a power bus and a data bus, said data bus being adapted to couple the variable residence time chamber module to a control module that provides control signal to the variable residence time chamber module, and said power bus being adapted to electrically couple to a power source that supplies electrical current to energize the variable residence time chamber module.

13. The variable residence time chamber module of claim 1, wherein at least one of said plurality of residence time chambers comprises a volume that is sufficiently small so as to enable a laminar flow within said at least one of said plurality of residence time chambers.

14. The variable residence time chamber module of claim 1, wherein at least one of said plurality of residence time chambers includes means for facilitating production of said desired chemical product.

15. The variable residence time chamber module of claim 14, wherein said means comprises at least one of a glass bead packing, a silica packing, a catalyst packing, an external heat exchanger, and an external heating element.

16. The variable residence time chamber module of claim 1, further comprising a sensor adapted to produce a signal indicative of a parameter relating to a reaction of the mixed reactants, said at least one sensor being disposed in at least one of said plurality of residence time chambers.

17. The variable residence time chamber module of claim 16, wherein the sensor comprises one of a temperature sensor, an electrochemical sensor, an optical sensor, and a pressure sensor.

18. The variable residence time chamber module of claim 1, further comprising means for facilitating production of said desired chemical product.

19. The variable residence time chamber module of claim 18, wherein said means include at least one of a source of electromagnetic radiation, a source of sonic radiation, a source of alpha radiation, a source of beta radiation, a source of gamma radiation, a source of X-rays, a source of radioactive particles, a source of charged particles, a source of thermal energy, a source of light, an electric field source, and a magnetic field source.

20. A residence time chamber module providing a selectively variable residence time for mixed yet incompletely reacted reactants, said selectively variable residence time enabling said reactants to completely react to form a desired product, comprising:
  (a) a housing defining an internal volume;
  (b) an inlet port adapted to be coupled in fluid communication with an outlet of a chemical reactor;
  (c) an outlet port adapted to be coupled in fluid communication with an inlet of one of a product collector and a chemical processing module;
  (d) a plurality of fluid chambers disposed within said internal volume, each fluid chamber having a characteristic residence time volume in which the mixed, but incompletely reacted reactants can be retained until completely reacted to form the desired product;
  (e) an inlet valve that is actuatable to selectively couple the inlet port in fluid communication with any of said plurality of fluid chambers to supply the mixed but incompletely reacted reactants thereto; and
  (f) an outlet valve that is actuatable to selectively couple said outlet port with any of said plurality of fluid chambers to withdraw the desired reactant therefrom.

21. The residence time chamber module of claim 20, further comprising a heat transfer media inlet and a heat transfer media outlet disposed in the housing, said housing having an internal volume that is filled with a heat transfer media through the heat transfer media inlet, to retain the mixed but incompletely reacted reactants heat exchanger at a desired temperature, spent heat transfer media being removed from the housing through the heat transfer media outlet.

22. The residence time chamber module of claim 20, wherein said inlet valve and said outlet valve each comprises a rotary valve.

23. The residence time chamber module of claim 20, wherein said housing is insulated to reduce heat transfer between an ambient environment and the plurality of fluid chambers.

24. The residence time chamber module of claim 20, wherein at least a portion of each of said inlet valve and said outlet valve is disposed within said housing.

25. The residence time chamber module of claim 20, wherein at least one of said plurality of fluid chambers has one of an elongate shape, a coiled tube shape, and an irregular shape.

26. The residence time chamber module of claim 20, further comprising a sensor disposed in at least one of the plurality of fluid chambers and adapted to produce a signal indicative of a parameter relating to a reaction of the mixed but incompletely reacted reactants.

27. The residence time chamber module of claim 26, wherein the sensor comprises one of a temperature sensor, an electrochemical sensor, an optical sensor, and a pressure sensor.

28. The residence time chamber module of claim 20, wherein at least one of said plurality of fluid chambers includes means for facilitating production of said desired product.

29. The residence time chamber module of claim 28, wherein said means comprises at least one of a glass bead packing, a silica packing, a catalyst packing, and a filter.

30. The residence time chamber module of claim 20, further comprising means for facilitating production of said desired product.

31. The residence time chamber module of claim 30, wherein said means comprise at least one of a source of electromagnetic radiation, a source of sonic radiation, a source of alpha radiation, a source of beta radiation, a source of gamma radiation, a source of X-rays, a source of radioactive particles, a source of charged particles, a source of light, an electric field source, and a magnetic field source.

32. The residence time chamber module of claim 20, further comprising a prime mover drivingly coupled to actuate at least one of said inlet valve and said outlet valve, to automatically select one of the plurality of fluid chambers.

33. The residence time chamber module of claim 32, further comprising a power bus and a data bus, said data bus being adapted to couple said residence time chamber module to a control module that provides control signal to the residence time chamber module, and said power bus being adapted to electrically couple said residence time chamber module to a power source that supplies an electrical current to energize the residence time chamber module.

34. The residence time chamber module of claim 20, wherein at least one of said plurality of fluid chambers includes an air escape valve that enables air contained within said at least one of said plurality of fluid chambers to escape when said one of the plurality is filled with the mixed reactants, while preventing any mixed reactants from escaping during their reaction.

35. The residence time chamber module of claim 20, wherein at least one of said plurality of fluid chambers comprises a residence time volume that is different than a residence time volume of another one of said plurality of fluid chambers.

36. The residence time chamber module of claim 20, further comprising a heating source disposed proximate to at least one of said plurality of fluid chambers, such that a temperature of said at least one of said plurality of fluid chambers can be adjusted independently of a temperature of others of said plurality of fluid chambers.

37. The residence time chamber module of claim 20, further comprising an additional inlet valve, and an additional outlet valve, such that as the inlet and outlet valves are employed to perform one of filling a fluid chamber, flushing a fluid chamber and emptying a fluid chamber, the additional inlet valve and the additional outlet valve are employed to perform one of filling a different fluid chamber, flushing a different fluid chamber and emptying a different fluid chamber.

38. The residence time chamber module of claim 20, wherein the inlet valve is adapted to selectively couple said one of the fluid chambers in fluid communication with one of a solvent supply, a spent solvent reservoir, and a gas intake, and the outlet valve is adapted to selectively couple said one of the fluid chambers in fluid communication with one of a solvent supply, a spent solvent reservoir, and a gas exhaust.

39. The residence time chamber module of claim 20, wherein the inlet valve selectively couples the inlet port in fluid communication with successive ones of the plurality of fluid chambers, and wherein the outlet valve selectively couples the outlet port in fluid communication with successive ones of the plurality of fluid chambers.

40. A method for using a single residence time chamber module to provide variable residence times, comprising the steps of:
  (a) providing a residence time chamber module comprising an inlet valve, an outlet valve, and a plurality of fluid chambers;

(b) actuating said inlet valve to select a first fluid chamber of the plurality of fluid chambers;

(c) filling said first fluid chamber with a first volume of mixed yet incompletely reacted reactants;

(d) actuating said inlet valve to select a second fluid chamber of the plurality of fluid chambers;

(e) filling said second fluid chamber with a second volume of mixed yet incompletely reacted reactants;

(f) retaining said first volume of mixed yet incompletely reacted reactants in said first fluid chamber for a first length of time sufficient to ensure that the reactants completely react to form a first desired product; and then actuating said outlet valve to select said first fluid chamber, thereby withdrawing said first desired product from the first fluid chamber; and (g) retaining said second volume of mixed yet incompletely reacted reactants in said second fluid chamber for a second length of time sufficient to ensure that the reactants completely react to form a second desired product; and then actuating said outlet valve to select said second fluid chamber, thereby withdrawing said second desired product, said first length of time and said second length of time not necessarily being equal.

41. The method of claim 40, further comprising the step of flushing said first fluid chamber and said second fluid chamber with a solvent prior to filling the first and the second fluid chambers with the first and the second volumes, respectively.

42. The method of claim 40, further comprising the step of flushing said first fluid chamber and said second fluid chamber with a solvent after withdrawing the first and the second desired products, respectively.

43. The method of claim 40, wherein said first length of time is shorter than said second length of time, and the step of withdrawing said first desired product is executed prior to the step of withdrawing said second desired product.

44. The method of claim 40, wherein said first length of time is longer than said second length of time, and the step of withdrawing said first desired product is executed after the step of withdrawing said second desired product.

45. The method of claim 40, further comprising the step of automatically executing steps (b) through (g) with a programmed controller.

46. The method of claim 40, further comprising the steps of:

(a) providing an additional inlet valve and an additional outlet valve; and (b) actuating said additional inlet valve and additional outlet valve, and said inlet valve and said outlet valve, to select any two fluid chambers simultaneously and to independently achieve one of a filling process, a flushing process, and an emptying process therein.

47. A chemical processing system for continuously processing at least one reactant to generate a desired product, said system comprising:

(a) a control module, said control module being adapted to monitor and control production of the desired chemical product by the chemical processing system;

(b) a reactant supply source for each of at least one reactant, a continuous flow of each reactant from its reactant supply source being controlled by the control module;

(c) a first reaction module in fluid communication with each reactant supply source to receive each reactant, said first reaction module being controllably connected to said control module and including a reactor, said reactor automatically initiating a chemical reaction that will ultimately produce the desired chemical product from said at least one reactant under control of the control module, said continuous flow of each reactant entering said reaction module, thereby resulting in a continuous flow of a reaction mixture from said reaction module; and (d) a residence time module in fluid communication with said reaction module, said residence time module comprising a plurality of individually addressable residence time chambers, each residence time chamber being adapted to store a finite volume of said reaction mixture exiting said reaction module for a finite time generally independent of the volume of the chamber, said finite time being sufficient to ensure that the stored reaction mixture completely reacts to form the desired product, said plurality of individually addressable residence time chambers having an aggregate volume sufficient to ensure that the continuous flow of reaction mixture from the reaction module is not interrupted, each individual residence time chamber discharging the completed product after said finite time has elapsed, so that as different individual residence time chambers discharge product, a continuous flow of product exits said residence time module.

48. A method for processing at least one reactant to produce a desired chemical product, comprising the steps of:

(a) providing a plurality of modules that are adapted to be readily reconfigurable into a modular system, said plurality of modules including:

(i) a control module;

(ii) a pump module controllably connected to said control module, said pump module comprising at least one pump adapted to pump a fluid through the modular system;

(iii) a reaction module in fluid communication with the pump module, said reaction module including a reactor and being adapted to continually process at least one reactant to generate at least one of a reaction mixture and said desired chemical product;

(iv) a supply of each reactant used, each supply being adapted to continually provide a reactant to said reaction module;

(v) a residence time module including a plurality of residence time chambers, each residence time chamber providing a discontinuous storage of a portion of a continuous flow of reaction mixture from said reaction module for a finite time generally independent of the volume of the chamber, said finite time being sufficiently long to ensure that the discontinuous storage of said portion of the reaction mixture enables said portion of the reaction mixture to completely react to form the desired product;

(b) causing the control module to automatically control said pump module, said reaction module, and said supply of each reagent used to establish a desired continuous flow rate of said at least one reactant into said reaction module, thereby establishing a continuous process and providing a continuous flow rate of at least one of said reaction mixture and said desired chemical product out of said reaction module; and (c) causing the control module to automatically control said residence time module such that the continuous flow rate exiting said reaction module is separated into a plurality of discrete portions, each portion being diverted into a different one of said plurality of residence time chambers that holds said discrete portion for said finite time, said discrete portions being discharged from each individual residence time chambers once said finite time has elapsed, such that a continuous flow of completed product exits the residence time module.

49. A variable residence time chamber module providing volumes in which mixed but incompletely reacted reactants exiting from a chemical reactor can be held for a time sufficient to enable the reactants to completely react to form a desired product, comprising:

(a) a fluid inlet port;

(b) an inlet valve in fluid communication with said fluid inlet port;

(c) a fluid outlet port;

(d) an outlet valve in fluid communication with said fluid outlet port; and (e) a plurality of residence time chambers, each residence time chamber being disposed downstream of said fluid inlet port, and upstream of said fluid outlet port, relative to a flow of a fluid throughout said variable residence time chamber module, each residence time chamber being selectively placed in fluid communication with said fluid inlet by said inlet valve, and selectively placed in fluid communication with said fluid outlet by said outlet valve, such that a specific residence time chamber can be filled with a fluid introduced via said fluid inlet port by manipulating said inlet valve, and a specific residence time chamber can be emptied of a fluid via said fluid outlet port by manipulating said outlet valve, after such fluid has been retained in the residence time chamber for a time sufficient to ensure that incompletely reacted reactants completely react to form a desired product.

50. The variable residence time chamber module of claim 49, wherein said inlet valve includes only a single fluid passage, such that only one of said plurality of residence time chambers is placed in fluid communication with said fluid inlet port at any one time.

51. The variable residence time chamber module of claim 49, wherein said outlet valve includes only a single fluid passage, such that only one of said plurality of residence time chambers is placed in fluid communication with said fluid outlet port at any one time.

52. The variable residence time chamber module of claim 49, wherein said inlet valve and said outlet valve are independently controlled, such that when a specific residence time chamber is placed in fluid communication with said fluid inlet port by said inlet valve, said outlet valve is selectively manipulatable to place any one of the plurality of residence time chambers in fluid communication with said fluid outlet port.

53. The variable residence time chamber module of claim 49, wherein none of said plurality of residence time chambers is placed in fluid communication with another one of said plurality of residence time chambers.

54. The variable residence time chamber module of claim 49, wherein at least one of said plurality of residence time chambers comprises a gas permeable membrane, thereby enabling a gas contained within that one residence time chamber to escape when a liquid is introduced into that one residence time chamber.

55. The variable residence time chamber module of claim 49, wherein each different residence time chamber is serviced by a different heat exchanger.

56. The variable residence time chamber module of claim 49, wherein at least one of said plurality of residence time chambers is filled with a packing material selected to enhance production of the desired product.

57. The variable residence time chamber module of claim 49, wherein at least one of said plurality of residence time chambers comprises a filter capable of separating the desired product from a byproduct.

58. The variable residence time chamber module of claim 49, wherein each residence time chamber comprises a filter, further comprising a bypass fluid line that enables a product and a byproduct to be individually removed from the residence time chamber.

59. A variable residence time module providing volumes in which mixed but incompletely reacted reactants exiting from a chemical reactor can be held for a time sufficient to enable the reactants to completely react to form a desired product, comprising:

(a) a mixed reactants inlet port;

(b) a gas inlet port (c) an inlet valve that is selectively in fluid communication with one of said mixed reactants inlet port and said gas inlet port;

(d) a product outlet port;

(e) a gas outlet port;

(f) an outlet valve that is selectively in fluid communication with one of said product outlet port and said gas outlet port; and (g) a plurality of residence time chambers, none of which are in fluid communication with each other, each residence time chamber being selectively placed in fluid communication with one of said mixed reactants inlet port and said gas inlet port by said inlet valve, and each residence time chamber being selectively placed in fluid communication with one of said product outlet port and said gas outlet port by said outlet valve.

60. The variable residence time chamber module of claim 59, further comprising a solvent inlet port, and a solvent outlet port, wherein said inlet valve is selectively in fluid communication with one of said mixed reactants inlet port, said gas inlet port and said solvent inlet port, and wherein said outlet valve is selectively in fluid communication with one of said product outlet port, said gas outlet port, and said solvent outlet port.

61. A variable residence time module providing volumes in which mixed but incompletely reacted reactants exiting from a chemical reactor can be held for a time sufficient to enable the reactants to completely react to form a desired product, comprising:

(a) a mixed reactants inlet port;

(b) a mixed reactants valve that is in fluid communication with said mixed reactants inlet port;

(c) a gas inlet port;

(d) a first gas valve that is in fluid communication with said gas inlet port;

(e) an inlet valve, said inlet valve being selectively placed in fluid communication with said mixed reactants inlet port by said mixed reactants valve, and being selectively placed in fluid communication with said gas inlet port by said first gas valve;

(f) a product outlet port;

(g) a product valve that is in fluid communication with said product outlet port;

(h) a gas outlet port;

(i) a second gas valve that is in fluid communication with said gas outlet port;

(j) an outlet valve, said outlet valve being selectively placed in fluid communication with said product outlet port by said product valve, and being selectively placed in fluid communication with said gas outlet port by said second gas valve;

(k) a plurality of residence time chambers, none of which are in fluid communication with each other, each residence time chamber being selectively placed in fluid communication with one of said mixed reactants inlet port and said gas inlet port by said inlet valve, and each residence time chamber being selectively placed in fluid communication with one of said product outlet port and said gas outlet port by said outlet valve.

62. A method for providing sufficient residence time for a continuous flow of mixed but incompletely reacted reactants to enable a desired product to be generated, in which the residence time provided is generally independent of a volume, comprising the steps of:

(a) introducing successive different portions of the continuous flow of mixed but incompletely reacted reactants into successive different volumes for storage during a period of time, such that the continuous flow of mixed but incompletely reacted reactants is not disrupted;

(b) storing each portion in its respective volume for a period of time sufficient to enable the desired product to be generated, the residence time provided being generally independent of a dimension of the volume; and (c) emptying each volume to recover the product generated from its respective portion.

63. The method of claim 62, further comprising the step of introducing an additional portion of the continuous flow of mixed but incompletely reacted reactants into a previously utilized volume, once that previously utilized volume has been emptied.

64. The method of claim 63, further comprising the step of rinsing each previously utilized volume before introducing an additional portion of the continuous flow of mixed but incompletely reacted reactants into the previously utilized volume.

65. The method of claim 62, further comprising the step of varying a length of time a portion is stored in a specific volume, as compared to lengths of time other portions are stored in other volumes.

66. The method of claim 62, further comprising the step of determining a flow rate of the continuous flow of mixed but incompletely reacted reactants, the capacity of each volume, and the length of time required to ensure the mixed but incompletely reacted reactants generate the desired product determining a number of different volumes required to ensure that an empty volume is always available for a portion of the continuous flow to prevent its disruption.

* * * * *